US011084183B2

(12) United States Patent
Schrul et al.

(10) Patent No.: US 11,084,183 B2
(45) Date of Patent: Aug. 10, 2021

(54) PROCESS FOR MANUFACTURING IN-LINE COATED WOOD-BASED BOARDS

(71) Applicant: Omya International AG, Oftringen (CH)

(72) Inventors: Christopher Schrul, Aarburg (CH); Philipp Hunziker, Loveland, OH (US)

(73) Assignee: Omya International AG, Oftringen (CH)

( * ) Notice: Subject to any disclaimer, the term of this patent is extended or adjusted under 35 U.S.C. 154(b) by 0 days.

(21) Appl. No.: 16/749,545

(22) Filed: Jan. 22, 2020

(65) Prior Publication Data

US 2020/0215717 A1    Jul. 9, 2020

Related U.S. Application Data

(63) Continuation of application No. 15/778,823, filed as application No. PCT/EP2017/050001 on Jan. 2, 2017, now Pat. No. 10,618,196.

(Continued)

(30) Foreign Application Priority Data

Jan. 8, 2016    (EP) ..................... 16150612

(51) Int. Cl.
*B27N 3/02* (2006.01)
*B27N 3/04* (2006.01)
(Continued)

(52) U.S. Cl.
CPC ................. *B27N 3/02* (2013.01); *B27N 3/04* (2013.01); *C04B 26/10* (2013.01); *C04B 26/12* (2013.01);
(Continued)

(58) Field of Classification Search
CPC ..... C04B 18/26; C04B 18/248; C04B 18/265; C04B 26/16; C04B 26/127; C04B 26/14;
(Continued)

(56) References Cited

U.S. PATENT DOCUMENTS 4,308,298 A    12/1981  Chen
4,620,892 A    11/1986  Dodson et al.
(Continued)

FOREIGN PATENT DOCUMENTS

DE    4310191    10/1993
EP    2226201    9/2010
(Continued)

OTHER PUBLICATIONS

International Search Report and Written Opinion of the International Searching Authority for PCT/EP2017/050001, dated Jul. 19, 2018, 20 pages.

(Continued)

*Primary Examiner* — Camie S Thompson
(74) *Attorney, Agent, or Firm* — Heslin Rothenberg Farley & Mesiti, P.C.

(57) ABSTRACT

The present invention relates to a process for manufacturing a wood-based board, a wood-based board as use of a liquid coating composition comprising at least one particulate filler material and at least one binder for in-line coating of wood-based boards.

20 Claims, 7 Drawing Sheets

Related U.S. Application Data

(60) Provisional application No. 62/302,232, filed on Mar. 2, 2016.

(51) Int. Cl.

| | | |
|---|---|---|
| *C04B 26/12* | (2006.01) | |
| *C04B 26/16* | (2006.01) | |
| *C04B 26/10* | (2006.01) | |
| *B27N 3/12* | (2006.01) | |
| *C04B 111/00* | (2006.01) | |
| *B27N 3/06* | (2006.01) | |
| *B27N 3/10* | (2006.01) | |

(52) U.S. Cl.
CPC .............. *C04B 26/16* (2013.01); *B27N 3/06* (2013.01); *B27N 3/10* (2013.01); *B27N 3/12* (2013.01); *C04B 2111/00482* (2013.01); *Y02W 30/91* (2015.05)

(58) Field of Classification Search
CPC ... C04B 26/122; C04B 14/042; C04B 14/106; C04B 14/26; C04B 14/28; C04B 14/305; C04B 14/365; C04B 2111/00482; D21J 1/04; C08L 97/02; B27N 3/02; B27N 3/04; B27N 3/06; B27N 3/10; B27N 3/12; D04H 1/587; C03C 25/321; Y10T 442/2992; C08K 3/26; C01F 11/185; C01P 2004/51; C01P 2004/61; C01P 2004/54; C01P 2004/62; C01P 2006/62; C01P 2006/63; C01P 2006/64; C09J 11/04; D21H 17/675; D21H 19/385; D21H 21/52

USPC ......... 156/181; 52/408; 428/533; 427/389.9, 427/292.4, 297.4; 264/128; 210/506

See application file for complete search history.

(56) References Cited

U.S. PATENT DOCUMENTS

| | | |
|---|---|---|
| 5,422,170 A | 6/1995 | Iwata et al. |
| 5,705,001 A | 1/1998 | Iwata et al. |
| 2004/0258898 A1 | 12/2004 | Hume |
| 2009/0169812 A1 | 7/2009 | Fan |
| 2010/0300030 A1 | 12/2010 | Pervan et al. |
| 2011/0045966 A1 | 2/2011 | Shooshtari et al. |
| 2011/0250404 A1 | 10/2011 | Pervan et al. |
| 2014/0370319 A1 | 12/2014 | Vetter et al. |
| 2018/0345530 A1 | 12/2018 | Schrul et al. |
| 2020/0108524 A1* | 4/2020 | Schrul .................... C09C 1/021 |

FOREIGN PATENT DOCUMENTS

| | | |
|---|---|---|
| EP | 2944621 | 11/2015 |
| JP | S57117696 A | 7/1982 |
| JP | S61112601 A | 5/1986 |
| JP | H07214518 A | 8/1995 |
| JP | 2001246606 | 9/2001 |
| JP | 2004018643 A | 1/2004 |
| JP | 2011522138 A | 7/2011 |
| WO | 2006042651 | 4/2006 |

OTHER PUBLICATIONS

Salt Chemical Production Technology, Xu Xiaohui, China Central Radio and Television University Press, Jan. 2014, pp. 204-206.

* cited by examiner

PROCESS FOR MANUFACTURING IN-LINE COATED WOOD-BASED BOARDS

This application is a continuation of U.S. application Ser. No. 15/778,823, filed May 24, 2018, which is a U.S. National Phase filing under 35 U.S.C. § 371 of International Application No. PCT/EP2017/050001, filed Jan. 2, 2017, and published as WO 2017/118611 on Jul. 13, 2017. This application also claims priority to U.S. Provisional Application No. 62/302,232 filed Mar. 2, 2016 and European Application No. 16150612.6 filed Jan. 8, 2016. The entire contents of each of these applications are incorporated herein by reference.

BACKGROUND OF THE INVENTION

The present invention relates to a process for manufacturing a wood-based board, a wood-based board as use of a liquid coating composition comprising at least one particulate filler material and at least one binder for in-line coating of wood-based boards.

Wood-based boards are widely used for indoor applications such as in furniture, doors, flooring, houses, decorative wall lining, stair treads and underlayments or panelling substrates due to their reasonable costs, wide range and flexibility of application, consistency in strength, dimension stability and easiness of finishing. Such particle boards are composite products comprising mainly wood particles or wood fibres which are joined together, with or without using binder, under heat and pressure. Such boards and methods for preparing same are described in a number of documents. For instance, WO 2006/042651 A1 refers to light-coloured to white wooden material panels being produced from bleached wood fibres and/or vat-dyed with a white pigment. DE 43 10 191 A1 relates to wood-based panel boards including inorganic cellular materials and flame retardant. The inorganic cellular material comprises a cellular material made from inorganic materials. For example, these may be materials having an inorganic oxide such as silicon oxide or aluminium oxide as the principle component, with a granular structure filled with minute closed cells. U.S. Pat. Nos. 5,422,170 A and 5,705,001 A refer to wood based panels for which wood fibre, inorganic cellular material, flame retardant and an organic binder for binding these materials, are mixed together and hot press formed to give the wood based panel. US 2004/0258898 A1 relates to a method for fabricating fire retardant composite panels comprising: creating a water-based slurry of partially soluble boron salts; adding an adhesive to a ligneous material; and independently introducing said water-based slurry to said igneous material for fire retarding thereof. US 2009/169812 A1 refer to a process for making composite products from waste material comprises the steps of a) obtaining fibrous material produced by the thermal treatment of waste materials with pressurised steam; b) mixing the fibrous material with a binding material; c) forming the resulting mixture into a shape; d) pressing the shaped mixture under pressure; and e) hardening the mixture; wherein the process also comprises the steps of the separating out the fibrous material and deodorising the fibrous material. U.S. Pat. No. 5,705,001 A refers to a method of manufacturing a wood based panel comprising the steps of: mixing wood fibres, an inorganic cellular material, and a flame retardant, wherein the mixture proportions per 100 parts by weight of said wood fibres being at least 50 parts by weight of said inorganic cellular material, and 15 parts to 60 parts by weight of said flame retardant; applying a binder to the mixture; and subsequently hot press forming the mixture to form the wood based panel, wherein the wood fibres are a major component and the steps are carried out so that the wood based panel possesses a density of 0.27 gem' or less. Unpublished European patent application EP 15 196 997.9 refers to a particle board comprising a) a wood particle base layer having a first side and a reverse side, the wood particle base layer comprising i) wood particles in an amount from 60.0 to 97.5 parts by weight (d/d) and at least one particulate calcium carbonate-containing material in an amount from 2.5 to 40.0 parts by weight (d/d), based on the total dry weight of the wood particles and at least one particulate calcium carbonate-containing material of the wood particle base layer, and b) at least one wood particle surface layer being in contact with the first and/or reverse side of the wood particle base layer, the at least one wood particle surface layer comprising i) wood particles in an amount from 70.0 to 97.5 parts by weight (d/d) and at least one particulate calcium carbonate-containing material in an amount from 2.5 to 30.0 parts by weight (d/d), based on the total dry weight of the wood particles and the at least one particulate calcium carbonate-containing material of the at least one wood particle surface layer, wherein the sum of the amount of the wood particles and the at least one particulate calcium carbonate-containing material in each of the wood particle base layer and the at least one wood particle surface layer is 100.0 parts by weight (d/d), based on the total dry weight of the wood particles and the at least one particulate calcium carbonate-containing material in the layer. EP 2 944 621 A1 refers to a fiber board product comprising a) fibers in an amount from 50.0 to 99.0 parts by weight (d/d), based on the total dry weight of the fibers and the at least one particulate calcium carbonate-containing material, wherein the fibers in an amount of i) 0 to 20.0 wt.-%, based on the total amount of dry fibers, are of a size which is fractioned at a mesh sieve width of 0.05 mm, ii) 50.0 to 90.0 wt.-%, based on the total amount of dry fibers, are of a size which is fractioned at a mesh sieve width of 1.0 mm, and iii) 70.0 to 100.0 wt.-%, based on the total amount of dry fibers, are of a size which is fractioned at a mesh sieve width of 3.0 mm, as determined by sieve analysis, b) at least one particulate calcium carbonate-containing material in an amount from 1.0 to 50.0 parts by weight (d/d), based on the total dry weight of the fibers and the at least one particulate calcium carbonate-containing material, the at least one particulate calcium carbonate-containing material having a weight median particle size $d_{50}$ of 0.5 to 150.0 µm, and additionally c) at least one binder in an amount from 0.05 to 25.0 parts by weight (d/d), based on the total dry weight of the fibers and the at least one particulate calcium carbonate-containing material, and d) at least one wax in an amount from 0 to 5.0 parts by weight (d/d), based on the total dry weight of the fibers and the at least one particulate calcium carbonate-containing material, wherein the sum of the amount of the fibers and the at least one particulate calcium carbonate-containing material is 100.0 parts by weight (d/d), based on the total dry weight of the fibers and the at least one particulate calcium carbonate-containing material.

Even though a great variety of wood-based boards is already available on the market having tailored properties including strength, elastic properties, and further processability, a general disadvantage of said wood-based boards is that their manufacturing requires energy-, cost- and time-consuming post processing steps. In particular, the produced raw wood-based boards are typically surface-treated after hot pressing by cutting (format), sanding, coating, lacquering, laminating with a decorative paper etc., and especially sanding, in order to improve the properties and especially the characteristics of the boards' surface, such as the optical properties.

However, none of the foregoing documents explicitly mentions efficient manufacturing methods for wood-based boards and especially does not mention a process that provides wood-based boards having improved surface characteristics by avoiding energy-, cost- and time-consuming post processing steps, and especially sanding. Furthermore, there is a continuous need in the art for wood-based boards where the important mechanical properties such as bending strength and modulus of elasticity, internal bond strength, thickness swelling, elastic properties and further processability are maintained or even improved.

Therefore, there is a continuous need in the art for processes for the manufacturing of wood-based boards which have improved surface characteristics compared to existing wood-based boards and especially a process for the manufacturing of wood-based boards which avoids the implementation of post processing steps, and especially sanding. Furthermore, there is a continuous need for processes for the manufacturing of wood-based boards which provides maintained or even improved mechanical properties such as bending strength and modulus of elasticity, internal bond strength, thickness swelling, elastic properties.

Accordingly, it is an objective of the present invention to provide a process for the manufacturing of a wood-based board. A further objective is to provide a process for the manufacturing of a wood-based board having improved surface characteristics, and especially improved optical characteristics. Another objective is to provide a process for the manufacturing of a wood-based board that can be carried out under energy-, cost- and time-efficient conditions, i.e. by avoiding post processing steps. A further objective is to provide a process for the manufacturing of a wood-based board which avoids the implementation of post processing steps, and especially sanding, for improving the surface characteristics of the board. Another objective is to provide a process for the manufacturing of a wood-based board which allows the provision of a particle board in which the set of important mechanical properties such as bending strength and modulus of elasticity, internal bond strength, thickness swelling, elastic properties and further processability is maintained or even improved, preferably with respect to the international DIN standards. Further objectives can be gathered from the following description of the invention.

The foregoing and other objectives are solved by the subject-matter as defined herein in claim 1.

Advantageous embodiments of the inventive a process for the manufacturing of a wood-based board are defined in the corresponding sub-claims.

According to one aspect of the present application a process for the manufacturing of a wood-based board is provided. The process comprising the steps of
a) providing wood particles and/or fibres, in dry form or in form of an aqueous suspension,
b) providing a dry or liquid coating composition comprising at least one particulate filler material and at least one binder,
c) forming a wood-based mat having a first side and a reverse side from the wood particles and/or fibres provided in step a),
d) pre-pressing the wood-based mat of step c) into a pre-pressed wood-based mat, e) applying the dry or liquid coating composition of step b) on the first and/or reverse side of the pre-pressed wood-based mat obtained in step d), and
f) hot pressing the pre-pressed wood-based mat obtained in step e) into a solid wood-based board.

The inventors surprisingly found out that by the foregoing process it is possible to prepare wood-based boards with excellent surface characteristics without implementing post processing steps. Furthermore, by the process according to the present invention a wood-based board is provided, wherein the wood-based board has improved surface characteristics, and especially improved optical characteristics.

According to another aspect of the present invention, a wood-based board is provided. The wood-based board comprising
a) a base of wood particles and/or fibres as defined herein, and
b) a coating on the first and/or reverse side of the wood-based board, wherein the coating comprises
i) at least one particulate filler material, as defined herein, having a ratio of particle size $d_{80}$ to particle size $d_{20}$ [$d_{80}/d_{20}$] from 0.5 to 1.0, and
ii) at least one binder as defined herein.

According to one embodiment of the present wood-based board, the coating is penetrated into the surface of the wood-based board.

According to another embodiment of the present wood-based board, the at least one particulate filler material has i) a particle size $d_{98}$ of <500 ii) a particle size $d_{80}$ of 0.1 to 250 μm, iii) a median particle size $d_{50}$ of 0.1 to 150 μm, and iv) a particle size $d_{20}$ of 0.1 to 50 μm.

According to yet another embodiment of the present wood-based board, the surface of the coated side of the wood-based board has i) a brightness from 50 to 100%, according ISO R457 (Tappi452) and DIN 6167, ii) a yellowness from 2 to 70%, according ISO R457 (Tappi452) and DIN 6167, iii) L* from 50 to 100, according to DIN EN ISO 11664-4:2012, iv) a* from −5 to 10, according to DIN EN ISO 11664-4:2012, and v) b* from 0 to 30, according to DIN EN ISO 11664-4:2012.

According to one embodiment of the present wood-based board, the surface of the coated side of the wood-based board has i) a maximum roughness amplitude Sz from 20 to 800 ii) an arithmetic mean roughness Sa from 2 to 80 μm, and iii) a root mean square roughness Sq from 2 to 20 μm.

According to another embodiment of the present wood-based board, the at least one particulate filler material has i) a particle size $d_{98}$ of <500 ii) a particle size $d_{80}$ of 0.1 to 250 μm, iii) a median particle size $d_{50}$ of 0.1 to 150 μm, and iv) a particle size $d_{20}$ of 0.1 to 50 μm, and the surface of the coated side of the wood-based board has i) a brightness from 50 to 100%, according ISO R457 (Tappi452) and DIN 6167, ii) a yellowness from 2 to 70%, according ISO R457 (Tappi452) and DIN 6167, iii) L* from 50 to 100, according to DIN EN ISO 11664-4:2012, iv) a* from −5 to 10, according to DIN EN ISO 11664-4:2012, and v) b* from 0 to 30, according to DIN EN ISO 11664-4:2012, and i) a maximum roughness amplitude Sz from 20 to 800 μm, ii) an arithmetic mean roughness Sa from 2 to 80 μm, and iii) a root mean square roughness Sq from 2 to 20 μm.

According to yet another embodiment of the present wood-based board, the wood-based board further comprises a printing on the first and/or reverse side of the wood-based board, preferably on the coating of the wood-based board.

According to one embodiment of the present wood-based board, the wood-based board is a fibre board product, preferably a high-density fibre (HDF) board, medium-density fibre (MDF) board, low-density fibre (LDF) board, a particle board, an oriented strandboard (OSB), a hardboard or an insulation board.

According to another embodiment of the present wood-based board, the wood-based board has a bending strength of ≥5 N/mm², preferably from 10 to 50 N/mm² and most preferably from 15 to 45 N/mm²; and/or a modulus of elasticity of ≥500 N/mm², preferably from 1 000 to 4 500 N/mm² and most preferably from 1 500 to 3 500 N/mm²; and/or an internal bond strength of ≥0.10 N/mm², more preferably from 0.2 to 1.4 N/mm² and most preferably from 0.4 to 1.2 N/mm²; and/or a thickness swelling after 24 h water storage of ≤20%, more preferably from 2.0 to 15.0% and most preferably from 4.0 to 10%; and/or a brightness of at least 50%, more preferably of at least 65%, even more preferably of at least 75% and most preferably of at least 80%.

According to another aspect of the present invention, a use of a dry or liquid coating composition comprising at least one particulate filler material and at least one binder as defined herein for in-line coating of wood-based boards is provided.

Advantageous embodiments of the present invention are defined in the corresponding sub-claims.

According to one embodiment of the present invention, the wood particles and/or fibres of step a) originate from primary wood sources, preferably softwood tree species, hardwood tree species, non-wood fibre plants, or secondary wood sources, preferably recycled wood, and mixtures thereof.

According to another embodiment of the present invention, the wood particles and/or fibres of step a) are combined simultaneously or separately in any order with at least one base binder and/or at least one additive, preferably the at least one base binder is selected from the group comprising phenol-formaldehyde resin (PF), urea-formaldehyde resin (UF), melamine-formaldehyde resin (MF), melamine-urea-formaldehyde resin (MUF), urea-melamine-formaldehyde resin (UMF), urea-melamine-phenol-formaldehyde resin (UMPF), epoxy resin, methylene diphenyl diisocyanate resin (MDI), polyurethane resin (PU), resorcinol resin, starch or carboxymethylcellulose and mixtures thereof, and/or the at least one additive is selected from the group comprising waxes, colorants, filler, dispersants, biocides, hardener, flame retardants and mixtures thereof.

According to yet another embodiment of the present invention, the wood particles of step a) are wood chips.

According to one embodiment of the present invention, the at least one particulate filler material of step b) is selected from the group consisting of dolomite, ground calcium carbonate (GCC), preferably ground calcium carbonate (GCC) selected from the group comprising marble, chalk, limestone and mixtures thereof, precipitated calcium carbonate (PCC), preferably precipitated calcium carbonate (PCC) selected from the group comprising one or more of the aragonitic, vateritic and calcitic mineralogical crystal forms, magnesium hydroxide, talc, gypsum, titanium dioxide, kaolin, silicate, mica, barium sulphate, calcined clay, non-calcined (hydrous) clay, bentonite, inorganic or organic pigments and mixtures thereof.

According to another embodiment of the present invention, the at least one particulate filler material of step b) is provided i) in powder form, or ii) in form of an aqueous slurry comprising the filler material in an amount from 1.0 to 80.0 wt.-%, preferably from 30.0 to 78.0 wt.-%, more preferably from 50.0 to 78.0 wt.-% and most preferably from 55.0 to 70.0 wt.-%, based on the total weight of the aqueous slurry.

According to yet another embodiment of the present invention, the at least one particulate filler material of step b) is at least one particulate calcium carbonate-containing material having a median particle size $d_{50}$ from 0.1 µm to 150.0 µm, more preferably from 0.2 µm to 100.0 µm and most preferably from 0.3 µm to 50.0 µm and/or a specific surface area of from 0.5 to 200.0 m²/g, more preferably of from 0.5 to 100.0 m²/g and most preferably of from 0.5 to 75.0 m²/g as measured by the BET nitrogen method.

According to one embodiment of the present invention, the at least one binder of step b) is selected from the group consisting of alkyd resin, epoxy resin, epoxy ester resin, poly(vinyl alcohol), poly(vinyl pyrrolidone), poly(vinyl acetate), poly(oxazolines), poly(vinylacetamides), partially hydrolyzed poly(vinyl acetate/vinyl alcohol), poly((meth) acrylic acid), poly((meth)acrylamide), poly(alkylene oxide), polyether, saturated polyester, sulfonated or phosphated polyesters and polystyrenes, poly(styrene-co-(meth)acrylate), poly(styrene-co-butadiene), polyurethane latex, poly (n-butyl (meth)acrylate), poly(2-ethylhexyl (meth)acrylate), copolymers of (meth)acrylates, such as n-butyl(meth)acrylate and ethyl(meth)acrylate, copolymers of vinylacetate and n-butyl(meth)acrylate casein, copolymers of polyvinylchloride, gelatin, cellulose ethers, zein, albumin, chitin, chitosan, dextran, pectin, collagen derivatives, collodian, agar-agar, arrowroot, guar, carrageenan, starch, tragacanth, xanthan, or rhamsan and mixtures thereof.

According to another embodiment of the present invention, the dry or liquid coating composition of step b) comprises the at least one particulate filler material in an amount from >60 parts by dry weight based on dry coating (d/d), preferably >70 parts d/d, more preferably >80 parts d/d and most preferably >85 parts d/d and the at least one binder in an amount from <40 parts d/d, preferably <30 parts d/d, more preferably <20 parts d/d, most preferably <15 parts d/d, and the sum of the amount of the at least one particulate filler material and the at least one binder is 100.0 parts d/d, based on the total dry weight of the at least one particulate filler material and the at least one binder.

According to yet another embodiment of the present invention, the dry or liquid coating composition of step b) further comprises at least one compound selected from the group comprising matting agents, coalescent agents or film forming agents, anti-foaming agents, dispersants, rheology agents, cross-linking agents, biocides, light stabilizer, preserving agents, hardener, flame retardants and mixtures thereof, preferably the dry or liquid coating composition of step b) comprises the at least one compound in an amount from 2.0 to 8.0 parts by weight (d/d), e.g. from 3.0 to 7.0 parts by weight (d/d), based on the total dry weight of the at least one particulate filler material and the at least one binder.

According to one embodiment of the present invention, a single or multi-layer wood-based mat is formed in step c).

According to another embodiment of the present invention, pre-pressing step d) is carried out at ambient temperature, e.g. from 10 to 60° C., more preferably from 15 to 30° C., and/or a pressure ranging from 5 to 40 bar, preferably from 8 to 35 bar.

According to yet another embodiment of the present invention, coating step e) is carried out by metering size press, curtain coating, spray coating or roller coating.

According to one embodiment of the present invention, coating step e) is carried out on the first and reverse side of the pre-pressed wood-based mat to manufacture a wood-based board being coated on the first and the reverse side, and/or coating step e) is carried out a second time using a different or the same liquid coating composition of step b).

According to another embodiment of the present invention, hot pressing step f) is carried out at a temperature ranging from 130 to 260° C., more preferably from 160 to 240° C.

According to yet another embodiment of the present invention, the wood-based board is a fibre board product, preferably a high-density fibre (HDF) board, medium-density fibre (MDF) board, low-density fibre (LDF) board, a particle board, an oriented strandboard (OSB), a hardboard or an insulation board.

It should be understood that for the purposes of the present invention, the following terms have the following meanings:

A "suspension" or "slurry" in the meaning of the present invention comprises insoluble solids and a solvent or liquid, preferably water, and optionally further additives such as dispersants, biocides and/or thickener, and usually contains large amounts of solids and, thus, is more viscous and can be of higher density than the liquid from which it is formed.

The term "aqueous" suspension or slurry refers to a system, wherein the liquid phase comprises, preferably consists of, water. However, said term does not exclude that the liquid phase of the aqueous slurry or suspension comprises minor amounts of at least one water-miscible organic solvent selected from the group comprising methanol, ethanol, acetone, acetonitrile, tetrahydrofuran and mixtures thereof. If the aqueous suspension or slurry comprises at least one water-miscible organic solvent, the liquid phase of the aqueous slurry comprises the at least one water-miscible organic solvent in an amount of from 0.1 to 40.0 wt.-% preferably from 0.1 to 30.0 wt.-%, more preferably from 0.1 to 20.0 wt.-% and most preferably from 0.1 to 10.0 wt.-%, based on the total weight of the liquid phase of the aqueous suspension or slurry. For example, the liquid phase of the aqueous suspension or slurry consists of water. If the liquid phase of the aqueous suspension or slurry consists of water, the water to be used can be any water available such as tap water and/or deionised water.

For the purpose of the present application, "water-insoluble" materials are defined as materials which, when 100 g of said material is mixed with 100 g deionised water and filtered on a filter having a 0.2 μm pore size at 20° C. to recover the liquid filtrate, provide less than or equal to 0.1 g of recovered solid material following evaporation at 95 to 100° C. of 100 g of said liquid filtrate at ambient pressure. "Water-soluble" materials are defined as materials which, when 100 g of said material is mixed with 100 g deionised water and filtered on a filter having a 0.2 μm pore size at 20° C. to recover the liquid filtrate, provide more than 0.1 g of recovered solid material following evaporation at 95 to 100° C. of 100 g of said liquid filtrate at ambient pressure.

The term "d/d" in the meaning of the present invention refers to the dry amount of additive based on the dry amount of the defined material.

The term "particulate" filler material refers to separate and distinct solid particles of the filler material.

The term "filler material" refers to natural or synthetic substances added to materials, such as paper, plastics, rubber, paints and adhesives etc., to lower the consumption of more expensive materials such as binders, or to enhance technical properties of the products. The person skilled in the art very well knows the typical fillers used in the respective fields.

The term "binder" as used in the present invention is a compound or compound mixture that is conventionally used to bind together the particles of one material or to bind together the particles of one material with the particles of two or more other materials to form a composite.

For the purpose of the present invention, the particle diameter "$d_x$" represents the diameter relative to which x % by weight of the particles have diameters less than $d_x$. This means that the $d_{20}$ value is the particle size at which 20% of all particles are smaller, and the $d_{80}$ value is the particle size at which 80% of all particles are smaller. The $d_{50}$ value is thus the median particle size, i.e. 50% of all grains are smaller than this particle size. For example, the $d_{50}$(wt.) value is the weight median particle size, i.e. 50 wt.-% of all grains are smaller than this particle size, and the $d_{50}$ (vol.) value is the volume median particle size, i.e. 50 vol.-% of all grains are smaller than this particle size. For the purpose of the present invention, the "particle sizes" of particles having a median particle size $d_{50}$ of >45 μm were determined from the volume determined particle size distributions. Furthermore, the "particle sizes" of particles having a median particle size $d_{50}$ of ≤45 μm were determined from the weight determined particle size distributions. It is thus appreciated that the particle sizes given throughout the present application are based on the combination of the weight and volume determined particle sizes if the particles comprise particles having a median particle size $d_{50}$ of ≤45 μm and of >45 μm. For determining the weight median particle size $d_{50}$ value a Sedigraph, such as a Sedigraph™ 5120 or a Sedigraph™ 5100 of Micromeritics Instrument Corporation, can be used, i.e. the sedimentation method. The volume median particle size $d_{50}$ value of the at least one particulate filler material was measured by laser diffraction. In this method, the particle size is determined by measuring the intensity of light scattered as a laser beam passes through a dispersed particulate sample. The measurement was made with a Mastersizer 2000 or a Mastersizer 3000 of Malvern Instruments Ltd. (operating instrument software version 1.04). The weight determined particle size distribution corresponds to the volume determined particle size distribution if the particles are spherical and of constant density throughout the particle size distribution.

Where the term "comprising" is used in the present description and claims, it does not exclude other non-specified elements of major or minor functional importance. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Whenever the terms "including" or "having" are used, these terms are meant to be equivalent to "comprising" as defined above.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This e.g. means that, unless the context clearly dictates otherwise, the term "obtained" does not mean to indicate that e.g. an embodiment must be obtained by e.g. the sequence of steps following the term "obtained" even though such a limited understanding is always included by the terms "obtained" or "defined" as a preferred embodiment.

As set out above, the inventive process for manufacturing a wood-based board comprises at least the process steps of a), b), c), d), e) and f). In the following, it is referred to further details of the present invention and especially the foregoing steps of the inventive process for manufacturing a wood-based board.

Figure 1:
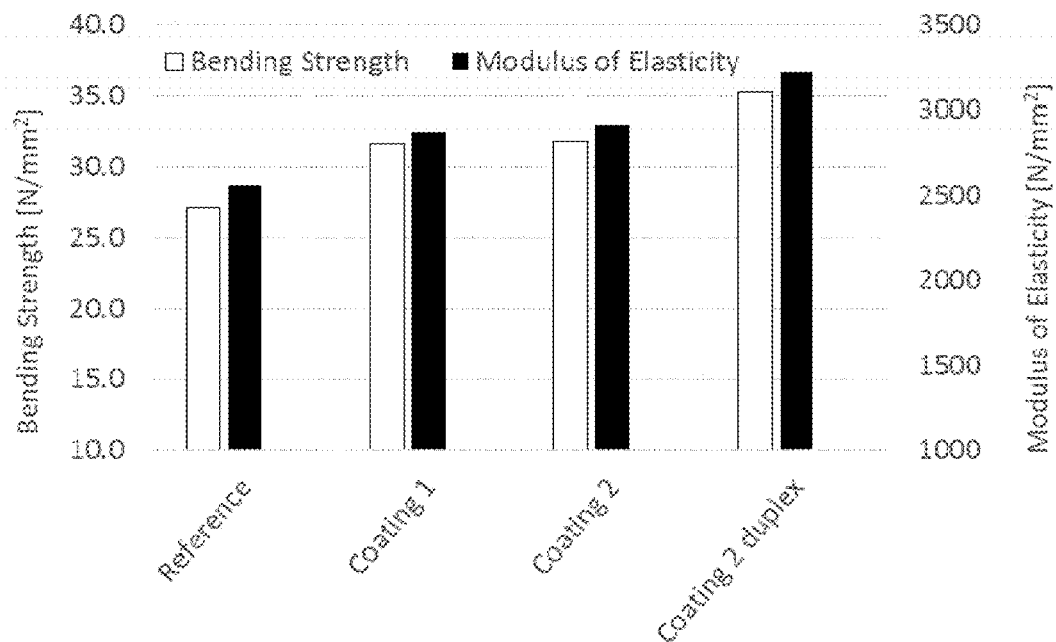
FIG. 1 shows the bending strength and modulus of elasticity of a medium-density fibre board substrate with example coatings in accordance with the invention, in comparison to reference boards without coatings.

Characterization of Step a): Provision of Wood Particles and/or Fibres

According to step a) of the process of the present invention, wood particles and/or fibres, in dry form or in form of an aqueous suspension, are provided.

Thus, it is one requirement that wood particles and/or fibres are provided.

It is appreciated that the wood particles may comprise one or more kinds of wood particles.

Accordingly, the wood particles may comprise one kind of wood particles.

Alternatively, the wood particles comprise a mixture of two or more kinds of wood particles. For example, the wood particles comprise a mixture of two or three kinds of wood particles. Preferably, the wood particles comprise one kind of wood particles.

It is appreciated that the wood particles present according to the present invention are not restricted to specific wood particles as long as they are suitable for the preparation of a wood-based boards.

Preferably, the wood particles are wood-based particles. The term "wood-based" particles in the meaning of the present invention refers to the common definition, i.e. wood is the fibrous, hard substance making up most of the tree trunk and branches of softwood and hardwood tree species.

Such wood-based particles can be any wood-based particles well known to the skilled person and typically used in wood-based boards.

For example, the wood particles originate from primary wood sources such as softwood tree species, hardwood tree species, non-wood fibre plants and mixtures thereof. Additionally or alternatively, the wood particles originate from secondary wood sources such as recycled wood.

The wood particles can be of specific dimensions. For example, the wood particles have i) a particle length in the range from 0.4 to 15 mm, more preferably from 3 to 15 mm and most preferably from 5 to 15 mm, and/or ii) a particle thickness in the range from 0.1 to 2.0 mm, more preferably from 0.2 to 1.5 mm and most preferably from 0.25 to 1.0 mm, and/or iii) a ratio of particle length to particle thickness of from 2 to 60 mm, more preferably from 5 to 60 mm and most preferably from 10 to 60 mm.

It is appreciated that the particle "length" refers to the longest dimension of the wood particles. The term particle "thickness" refers to the shortest dimension of the wood particles. It is appreciated that the length or thickness refers to the average length or average thickness.

Preferably, the wood particles have i) a particle length in the range from 0.4 to 15 mm, more preferably from 3 to 15 mm and most preferably from 5 to 15 mm, or ii) a particle thickness in the range from 0.1 to 2.0 mm, more preferably from 0.2 to 1.5 mm and most preferably from 0.25 to 1.0 mm, or iii) a ratio of particle length to particle thickness of from 2 to 60 mm, more preferably from 5 to 60 mm and most preferably from 10 to 60 mm.

Alternatively, the wood particles have i. a particle length in the range from 0.4 to 15 mm, more preferably from 3 to 15 mm and most preferably from 5 to 15 mm, and ii. a particle thickness in the range from 0.1 to 2.0 mm, more preferably from 0.2 to 1.5 mm and most preferably from 0.25 to 1.0 mm, and iii. a ratio of particle length to particle thickness of from 2 to 60 mm, more preferably from 5 to 60 mm and most preferably from 10 to 60 mm.

In one embodiment, the wood particles have a median particle size $d_{50}$ in the range from 0.4 to 15 mm, more preferably from 3 to 15 mm and most preferably from 5 to 15 mm.

Additionally or alternatively, the wood particles have a particle size $d_{90}$ in the range from 2 to 60 mm, more preferably from 5 to 60 mm and most preferably from 10 to 60 mm.

Specific examples of wood particles include cottonwood, spruce, pine, alder, birch, beech, oak and mixtures thereof.

Additionally or alternatively, wood fibres are provided. Preferably, the wood fibres may comprise one or more kinds of wood fibres.

Accordingly, the wood fibres may comprise one kind of wood fibres. Alternatively, the wood fibres may comprise a mixture of two or more kinds of wood fibres. For example, the wood fibres may comprise a mixture of two or three kinds of wood fibres. Preferably, the wood fibres comprise one kind of wood fibres.

Furthermore, the wood fibres may be in the form of separate wood fibres or wood fibre bundles.

It is appreciated that wood fibres according to the present invention are not restricted to specific wood fibres as long as they are suitable for the preparation of wood-based boards.

The term "wood" fibres in the meaning of the present invention refers to the common definition, i.e. wood is the fibrous, hard substance making up most of the tree trunk and branches of softwood and hardwood tree species.

For example, the wood fibres preferably originate from primary wood sources such as softwood tree species, hardwood tree species, non-wood fibre plants and mixtures thereof. Additionally or alternatively, the wood fibres originate from secondary wood sources such as recycled wood.

It is appreciated that the wood fibres have a specific size. Preferably, the wood fibres in an amount of
  i. 0 to 20 wt.-%, based on the total amount of dry wood fibres, are of a size which is fractioned at a mesh sieve width of 0.05 mm,
  ii. 50 to 90 wt.-%, based on the total amount of dry wood fibres, are of a size which is fractioned at a mesh sieve width of 1.0 mm, and
  iii. 70 to 100 wt.-%, based on the total amount of dry wood fibres, are of a size which is fractioned at a mesh sieve width of 3.0 mm.

The size of the wood fibres is measured by fractioning through sieve analysis in an air jet sieve Alpine e200 LS of HOSOKAWA ALPINE AG, Germany.

Specific examples of wood fibres include pine, fir, spruce, western hemlock, aspen, eucalyptus, cypress, poplar, cedar, beech, oak, birch, bamboo, cereal fibres, algae fibres, seed fibres, fruit fibres and mixtures thereof.

It is appreciated that the wood particles may be also in the form of wood chips. Preferably, wood particles in the form of wood chips may comprise one or more kinds of wood chips.

Accordingly, wood particles in the form of wood chips may comprise one kind of wood chips. Alternatively, wood particles in the form of wood chips may comprise a mixture of two or more kinds of wood chips. For example, wood particles in the form of wood chips may comprise a mixture of two or three kinds of wood chips. Preferably, wood particles in the form of wood chips comprise one kind of wood chips.

It is appreciated that wood chips according to the present invention are not restricted to specific wood chips as long as they are suitable for the preparation of wood-based boards.

If the wood particles are in the form of wood chips, the wood chips may have a specific size. Preferably, the wood chips have a particle length in the range from 1 to 100 mm, more preferably from 2 to 75 mm and most preferably from 3 to 50 mm.

It is appreciated that the particle "length" refers to the longest dimension of the wood chips.

Specific examples of wood chips include pine, fir, spruce, western hemlock, aspen, eucalyptus, cypress, poplar, cedar, beech, oak, birch, maple, bamboo, cereal fibres, algae fibres, seed fibres, fruit fibres and mixtures thereof.

In one embodiment, wood particles or wood fibres are provided.

Alternatively, a mixture of wood particles and wood fibres is provided. In this case the ratio of wood particles to wood fibres may vary within a broad range. For example, the mixture comprises a ratio of wood particles to wood fibres [particles:fibres] in a range from 100:1 to 1:100, preferably from 50:1 to 1:50 and most preferably from 20:1 to 1:20.

The wood particles and/or fibres are provided in dry form or in form of an aqueous suspension.

The term "dry form" with regard to the wood particles and/or fibres provided in step a) refers to wood particles and/or fibres having a moisture content of about 10.0 wt.-% or less, e.g. from 4 to 8 wt.-%, based on the total weight of the wood particles and/or fibres. It is appreciated that higher moisture contents are not preferred as it may be critical during pre-pressing step d) and especially during hot pressing step f).

Thus, the wood particles and/or fibres may optionally by pre-dried to reduce their moisture content in case the moisture content is >10.0 wt.-%, based on the total weight of the wood particles and/or fibres. The optional pre-drying of the wood particles and/or fibres to the desired level is preferably carried out in a pre-dryer such as a tube dryer. Tube dryer such as single-stage or multiple-stage tube dryer are well known in the art and are widely used for drying wood particles and/or fibres in the manufacturing of wood-based boards. The wood particles and/or fibres can be dried for a time period and/or at a temperature sufficient to reduce the moisture content of the wood particles and/or fibres to the desired level. The drying time and/or temperature may be adjusted according to the temperature and the moisture content of the wood particles and/or fibres.

Thus, it is appreciated that the wood particles and/or fibres are preferably provided in dry form in the present process for manufacturing a wood-based board.

Alternatively, the wood particles and/or fibres are provided in the form of an aqueous suspension.

The aqueous suspension of wood particles and/or fibres may be formed by suspending the wood particles and/or fibres provided in dry form, i.e. as obtained after the pre-dryer, in water or by diluting the wood particles and/or fibres obtained after the refiner to the desired wood particle and/or fibre and/or chip content.

If the wood particles and/or fibres are provided in form of an aqueous suspension, the aqueous suspension preferably comprises the wood particles and/or fibres in an amount from 1.0 to 80.0 wt.-%, based on the total weight of the aqueous suspension. More preferably, the aqueous suspension comprises the wood particles and/or fibres in an amount from 5.0 to 75.0 wt.-%, more preferably from 10.0 to 70.0 wt.-% and most preferably from 15.0 to 60.0 wt.-%, based on the total weight of the aqueous suspension.

In one embodiment, the wood particles and/or fibres of step a) are combined simultaneously or separately in any order with at least one base binder and/or at least one additive. Thus, the at least one base binder and/or at least one additive may be added simultaneously or separately in any order to the wood particles and/or fibres, in a manner known by the skilled person.

For example, the wood particles and/or fibres of step a) are combined separately in any order with at least one base binder and/or at least one additive. Alternatively, the wood particles and/or fibres of step a) are combined simultaneously with at least one base binder and/or at least one additive. If the wood particles and/or fibres of step a) are combined simultaneously with at least one base binder and/or at least one additive, the at least one base binder and/or at least one additive is preferably provided as mixture, i.e. the at least one base binder and/or at least one additive may be pre-mixed prior to addition to said wood particles and/or fibres.

The term "at least one" base binder in the meaning of the present invention means that the base binder comprises, preferably consists of, one or more base binder.

In one embodiment of the present invention, the at least one base binder comprises, preferably consists of, one base binder. Alternatively, the at least one base binder comprises, preferably consists of, two or more base binder. For example, the at least one base binder comprises, preferably consists of, two or three base binder. Preferably, the at least one base binder comprises, preferably consists of, one base binder.

For example, the at least one base binder may be present in an amount from 0.01 to 25.0 parts by weight (d/d), based on the total dry weight of the wood particles and/or fibres of step a).

The at least one base binder may be one or more binder which is/are well known to the skilled person and typically used in the base material of wood-based boards. For example, the at least one base binder is selected from the group comprising phenol-formaldehyde resin (PF), urea-formaldehyde resin (UF), melamine-formaldehyde resin (MF), melamine-urea-formaldehyde resin (MUF), urea-melamine-formaldehyde resin (UMF), urea-melamine-phenol-formaldehyde resin (UMPF), epoxy resin, methylene diphenyl diisocyanate resin (MDI), polyurethane resin (PU), resorcinol resin, starch or carboxymethylcellulose and mixtures thereof. Preferably, the at least one base binder is selected from the group comprising phenol-formaldehyde resin (PF), urea-formaldehyde resin (UF), melamine-formaldehyde resin (MF), melamine-urea-formaldehyde resin (MUF), urea-melamine-formaldehyde resin (UMF), urea-melamine-phenol-formaldehyde resin (UMPF), epoxy resin, methylene diphenyl diisocyanate resin (MDI), polyurethane resin (PU) and mixtures thereof. Most preferably, the at least one base binder is urea-formaldehyde resin (UF).

Additionally or alternatively, the at least one additive may be present in an amount from 0.01 to 10.0 parts by weight (d/d), based on the total dry weight of the wood particles and/or fibres of step a). The amount of the at least one additive to be optionally included can be determined in accordance with standard practice and with the desired properties of the final wood-based board.

The term "at least one" additive in the meaning of the present invention means that the additive comprises, preferably consists of, one or more additives.

In one embodiment of the present invention, the at least one additive comprises, preferably consists of, one additive. Alternatively, the at least one additive comprises, preferably consists of, two or more additives. For example, the at least one additive comprises, preferably consists of, two or three additives. Preferably, the at least one additive comprises, preferably consists of, two or more additives.

The at least one additive may be one or more additive which is/are well known to the skilled person and typically used in wood-based boards. For example, the at least one additive is selected from the group comprising waxes, colorants, filler, dispersants, biocides, hardener, flame retardants and mixtures thereof. Preferably, the at least one additive is selected from waxes, hardener and mixtures thereof. More preferably, the at least one additive comprises, most preferably consists of, waxes and hardener.

The combining (or mixing) of the wood particles and/or fibres of step a) with at least one base binder and/or at least one additive can be accomplished by any conventional means known to the skilled person. The skilled person will adapt the combining (or mixing) conditions such as the mixing speed and temperature according to his process equipment. Additionally, the combining (or mixing) may be carried out under homogenizing and/or particle dividing conditions.

Characterization of Step b): Provision of a at Least One Particulate Filler Material and at Least One Binder According to step b) of the present invention, a dry or liquid coating composition comprising at least one particulate filler material and at least one binder is provided.

The term "at least one" particulate filler material in the meaning of the present invention means that the particulate filler material comprises, preferably consists of, one or more particulate filler materials.

In one embodiment of the present invention, the at least one particulate filler material comprises, preferably consists of, one particulate filler material. Alternatively, the at least one particulate filler material comprises, preferably consists of, two or more particulate filler materials. For example, the at least one particulate filler material comprises, preferably consists of, two or three particulate filler materials. Preferably, the at least one particulate filler material comprises, preferably consists of, one particulate filler material.

For example, the at least one particulate filler material is selected from the group consisting of dolomite, ground calcium carbonate (GCC), precipitated calcium carbonate (PCC), magnesium hydroxide, talc, gypsum, titanium dioxide, kaolin, silicate, mica, barium sulphate, calcined clay, non-calcined (hydrous) clay, bentonite, inorganic or organic pigments and mixtures thereof.

"Dolomite" in the meaning of the present invention is a carbonatic calcium-magnesium-mineral having the chemical composition of $CaMg(CO_3)_2$ ("$CaCO_3MgCO_3$"). Dolomite mineral contains at least 30.0 wt.-% $MgCO_3$, based on the total weight of dolomite, preferably more than 35.0 wt.-%, more than 40.0 wt.-%, typically from 45.0 to 46.0 wt.-% $MgCO_3$.

"Ground calcium carbonate" (GCC) in the meaning of the present invention is a calcium carbonate obtained from natural sources, such as limestone, marble or chalk, and processed through a wet and/or dry treatment such as grinding, screening and/or fractionating, for example by a cyclone or classifier.

According to one embodiment of the present invention the GCC is obtained by dry grinding. According to another embodiment of the present invention the GCC is obtained by wet grinding and subsequent drying.

In general, the grinding step can be carried out with any conventional grinding device, for example, under conditions such that refinement predominantly results from impacts with a secondary body, i.e. in one or more of: a ball mill, a rod mill, a vibrating mill, a roll crusher, a centrifugal impact mill, a vertical bead mill, an attrition mill, a pin mill, a hammer mill, a pulveriser, a shredder, a de-clumper, a knife cutter, or other such equipment known to the skilled man. In case calcium carbonate-containing material comprises a wet ground calcium carbonate-containing material, the grinding step may be performed under conditions such that autogenous grinding takes place and/or by horizontal ball milling, and/or other such processes known to the skilled man. The wet processed ground calcium carbonate-containing material thus obtained may be washed and dewatered by well-known processes, e.g. by flocculation, filtration or forced evaporation prior to drying. The subsequent step of drying may be carried out in a single step such as spray drying, or in at least two steps. It is also common that such a calcium carbonate material undergoes a beneficiation step (such as a flotation, bleaching or magnetic separation step) to remove impurities.

In one embodiment of the present invention, the GCC is selected from the group comprising marble, chalk, limestone and mixtures thereof.

"Precipitated calcium carbonate" (PCC) in the meaning of the present invention is a synthesized material, generally obtained by precipitation following reaction of carbon dioxide and lime in an aqueous environment or by precipitation of a calcium and carbonate ion source in water. PCC may be one or more of the aragonitic, vateritic and calcitic mineralogical crystal forms. Preferably, PCC is one of the aragonitic, vateritic and calcitic mineralogical crystal forms.

Aragonite is commonly in the acicular form, whereas vaterite belongs to the hexagonal crystal system. Calcite can form scalenohedral, prismatic, spheral and rhombohedral forms. PCC can be produced in different ways, e.g. by precipitation with carbon dioxide, the lime soda process, or the Solvay process in which PCC is a by-product of ammonia production. The obtained PCC slurry can be mechanically dewatered and dried.

It is preferred that the at least one particulate filler material comprises at least one ground calcium carbonate (GCC), preferably at least one ground calcium carbonate (GCC) being selected from the group comprising marble, chalk, limestone and mixtures thereof. In one preferred embodiment, the at least one ground calcium carbonate (GCC) is marble or chalk.

Thus, it is preferred that the at least one particulate filler material is at least one particulate calcium carbonate-containing material. In addition to calcium carbonate, the at least one particulate calcium carbonate-containing material may comprise further metal oxides such as titanium dioxide and/or aluminium trioxide, metal hydroxides such as aluminium tri-hydroxide, metal salts such as sulphates, silicates such as talc and/or kaolin clay and/or mica, carbonates such as magnesium carbonate and/or gypsum, satin white and mixtures thereof.

According to one embodiment of the present invention, the amount of calcium carbonate in the at least one particulate calcium carbonate-containing material is of ≥10.0 wt.-%, preferably of ≥20.0 wt.-%, based on the total dry weight of the calcium carbonate-containing material. Preferably, the amount of calcium carbonate in the at least one particulate calcium carbonate-containing material is of ≥50.0 wt.-%, even more preferably of ≥90.0 wt.-%, more preferably of ≥95.0 wt.-% and most preferably of ≥97.0 wt.-%, based on the total dry weight of the calcium carbonate-containing material.

Preferably, the at least one particulate filler material of step b) has specific dimensions. For example, the at least one particulate filler material has a median particle size $d_{50}$ from 0.1 to 150.0 μm. In one embodiment of the present invention, the at least one particulate filler material has a median particle size $d_{50}$ from 0.2 μm to 100.0 μm, more preferably from 0.3 μm to 50.0 μm and most preferably from 2.1 μm to 40.0 μm.

The at least one particulate filler material may have a top cut, for example, of below 150.0 μm. The term "top cut" (or top size), as used herein, means the particle size value wherein at least 98.0% of the material particles are less than that size. Preferably, the at least one particulate filler material has a top cut of below 140.0 μm and more preferably of below 120.0 μm.

In one embodiment, the at least one particulate filler material has
 i. a particle size $d_{98}$ of <500 μm,
 ii. a particle size $d_{80}$ of 0.1 to 250 μm,
 iii. a median particle size $d_{50}$ of 0.1 to 150 μm, and
 iv. iv) a particle size $d_{20}$ of 0.1 to 50 μm.

Additionally or alternatively, the at least one particulate filler material has a ratio of particle size $d_{80}$ to particle size $d_{20}$ [$d_{80}/d_{20}$] from 0.5 to 1.0.

Preferably, the at least one particulate filler material has
 i. a particle size $d_{98}$ of ≤500 μm,
 ii. a particle size $d_{80}$ of 0.1 to 250 μm,
 iii. a median particle size $d_{50}$ of 0.1 to 150 μm,
 iv. a particle size $d_{20}$ of 0.1 to 50 μm, and
 v. a ratio of particle size $d_{80}$ to particle size $d_{20}$ [$d_{80}/d_{20}$] from 0.5 to 1.0.

In one embodiment, the at least one particulate filler material has a specific surface area of from 0.5 to 200.0 m$^2$/g, more preferably of from 0.5 to 100.0 m$^2$/g and most preferably of from 0.5 to 75.0 m$^2$/g as measured by the BET nitrogen method.

The term "specific surface area" (in m$^2$/g) of the at least one particulate calcium carbonate-containing material in the meaning of the present invention is determined using the BET method, which is well known to the skilled man (ISO 9277:2010).

The term "at least one" binder in the meaning of the present invention means that the binder comprises, preferably consists of, one or more binder.

In one embodiment of the present invention, the at least one binder comprises, preferably consists of, one binder. Alternatively, the at least one binder comprises, preferably consists of, two or more binder. For example, the at least one binder comprises, preferably consists of, two or three binder. Preferably, the at least one binder comprises, preferably consists of, one binder.

It is appreciated that the binder of step b) and the optional base binder of step a) may be the same or different. For example, the binder of step b) and the optional base binder of step a) are the same. Alternatively, the binder of step b) and the optional base binder of step a) are different.

Preferably, the binder of step b) and the optional base binder of step a) are different.

The at least one binder may be one or more binder which is/are well known to the skilled person and typically used in coatings of wood-based boards. In one embodiment, the at least one binder of step b) is selected from the group consisting of alkyd resin, epoxy resin, epoxy ester resin, poly(vinyl alcohol), poly(vinyl pyrrolidone), poly(vinyl acetate), poly(oxazolines), poly(vinylacetamides), partially hydrolyzed poly(vinyl acetate/vinyl alcohol), poly((meth)acrylic acid), poly((meth)acrylamide), poly(alkylene oxide), polyether, saturated polyester, sulfonated or phosphated polyesters and polystyrenes, poly(styrene-co-(meth)acrylate), poly(styrene-co-butadiene), polyurethane latex, poly(n-butyl (meth)acrylate), poly(2-ethylhexyl (meth)acrylate), copolymers of (meth)acrylates, such as n-butyl(meth)acrylate and ethyl(meth)acrylate, copolymers of vinylacetate and n-butyl(meth)acrylate casein, copolymers of polyvinylchloride, gelatin, cellulose ethers, zein, albumin, chitin, chitosan, dextran, pectin, collagen derivatives, collodian, agar-agar, arrowroot, guar, carrageenan, starch, tragacanth, xanthan, or rhamsan and mixtures thereof. Preferably, the at least one binder of step b) is selected from the group consisting of alkyd resin, epoxy resin, epoxy ester resin, poly(vinyl alcohol), poly(vinyl pyrrolidone), poly(vinyl acetate), poly(oxazolines), poly(vinylacetamides), partially hydrolyzed poly (vinyl acetate/vinyl alcohol), poly((meth)acrylic acid), poly ((meth)acrylamide), poly(alkylene oxide), polyether, saturated polyester, sulfonated or phosphated polyesters and polystyrenes, poly(styrene-co-(meth)acrylate), poly(styrene-co-butadiene), polyurethane latex, poly(n-butyl (meth) acrylate), poly(2-ethylhexyl (meth)acrylate), copolymers of (meth)acrylates, such as n-butyl(meth)acrylate and ethyl (meth)acrylate, copolymers of vinylacetate and n-butyl (meth)acrylate casein, copolymers of polyvinylchloride and mixtures thereof. More preferably, the at least one binder of step b) is selected from the group consisting of poly((meth) acrylic acid), polystyrenes, poly(styrene-co-(meth)acrylate), poly(styrene-co-butadiene), poly(n-butyl (meth)acrylate), poly(2-ethylhexyl (meth)acrylate), copolymers of (meth) acrylates, such as n-butyl(meth)acrylate and ethyl(meth) acrylate and mixtures thereof. Most preferably, the at least one binder of step b) is poly(styrene-co-(meth)acrylate) or poly(styrene-co-butadiene).

It is appreciated that the dry or liquid coating composition preferably comprises the at least one particulate filler material and at least one binder in specific amounts.

For example, the dry or liquid coating composition of step b) comprises the at least one particulate filler material in an amount from >60 parts by dry weight based on dry coating (d/d), preferably >70 parts d/d, more preferably >80 parts d/d and most preferably >85 parts d/d and the at least one binder in an amount from <40 parts d/d, preferably <30 parts d/d, more preferably <20 parts d/d, most preferably <15 parts d/d, and the sum of the amount of the at least one particulate filler material and the at least one binder is 100.0 parts d/d, based on the total dry weight of the at least one particulate filler material and the at least one binder.

Thus, the dry or liquid coating composition preferably comprises the at least one particulate filler material in an amount from >60 parts d/d and the at least one binder in an amount from <40 parts d/d. More preferably, the dry or liquid coating composition preferably comprises the at least one particulate filler material in an amount from >70 parts d/d and the at least one binder in an amount from <30 parts d/d. Even more preferably, the dry or liquid coating composition preferably comprises the at least one particulate filler material in an amount from >80 parts d/d and the at least one binder in an amount from <20 parts d/d. Most preferably, the dry or liquid coating composition preferably comprises the at least one particulate filler material in an amount from >85 parts d/d and the at least one binder in an amount from <15 parts d/d. The sum of the amount of the at least one particulate filler material and the at least one binder is 100.0 parts d/d, based on the total dry weight of the at least one particulate filler material and the at least one binder.

The term "dry" with regard to the at least one particulate filler material and the at least one binder is understood to be a material having less than 0.3% by weight of water relative to the weight of the at least one particulate filler material and the at least one binder. The % water content is determined according to the Coulometric Karl Fischer measurement method, wherein the at least one particulate filler material and the at least one binder is heated to 220° C., and the water content released as vapour and isolated using a stream of nitrogen gas (at 100 ml/min) is determined in a Coulometric Karl Fischer unit.

The at least one particulate filler material and at least one binder are provided in form of a dry or liquid coating composition in step b).

For the purposes of the present invention, the term "coating composition" refers to a composition which is applied on the surface of a pre-pressed wood-based mat and which remains predominantly on the surface of the final wood-based board.

The term "dry" with regard to the coating composition is understood to be a composition having less than 0.3% by weight of water relative to the weight of the coating composition. The % water content is determined according to the Coulometric Karl Fischer measurement method, wherein the coating composition is heated to 220° C., and the water content released as vapour and isolated using a stream of nitrogen gas (at 100 ml/min) is determined in a Coulometric Karl Fischer unit.

The term "liquid" with regard to the coating composition is understood to be a composition that is liquid under standard ambient temperature and pressure (SATP) which refers to a temperature of 298.15 K (25° C.) and an absolute pressure of exactly 100 000 Pa (1 bar, 14.5 psi, 0.98692 atm). The liquid is preferably a suspension (or dispersion).

If a dry coating composition is provided in step b), it is appreciated that the at least one particulate filler material as well as the at least one binder are preferably combined in dry form for obtaining the dry coating composition.

If a liquid coating composition is provided in step b), the at least one particulate filler material and/or the at least one binder is/are in form of an aqueous suspension. Preferably, the at least one particulate filler material and the at least one binder is in form of an aqueous suspension. More preferably, the at least one particulate filler material is in form of an aqueous suspension. For forming the liquid coating composition of step b), the at least one binder, such as in dry form, is preferably mixed into the at least one particulate filler material provided in form of an aqueous suspension.

In view of this, the at least one particulate filler material can be provided in powder form, i.e. in dry form. The term "dry" with regard to the at least one particulate filler material is understood to be a material having less than 0.3% by weight of water relative to the weight of the at least one particulate filler material.

If the at least one particulate filler material is provided in form of an aqueous suspension, the aqueous suspension preferably comprises the at least one particulate filler material in an amount from 1.0 to 80.0 wt.-%, based on the total weight of the aqueous suspension. More preferably, the aqueous suspension comprises the at least one particulate filler material in an amount from 30.0 to 78.0 wt.-%, more preferably from 50.0 to 78.0 wt.-% and most preferably from 55.0 to 78.0 wt.-%, based on the total weight of the aqueous suspension.

The dry or liquid coating composition may further comprise at least one compound which is well known to the skilled person and typically used in coatings of wood-based boards.

The term "at least one" compound in the meaning of the present invention means that the compound comprises, preferably consists of, one or more compound(s).

In one embodiment of the present invention, the at least one compound comprises, preferably consists of, one compound. Alternatively, the at least one compound comprises, preferably consists of, two or more compounds. For example, the at least one compound comprises, preferably consists of, two or three compounds. Preferably, the at least one compound comprises, preferably consists of, two or more compounds and thus is a mixture of compounds. For example, the dry or liquid coating composition of step b) further comprises at least one compound selected from the group comprising matting agents, coalescent agents or film forming agents, anti-foaming agents, dispersants, rheology agents, cross-linking agents, biocides, light stabilizer, preserving agents, hardener, flame retardants and mixtures thereof.

If the coating composition comprises the at least one compound, the liquid coating composition of step b) is preferably formed in that the at least one particulate filler material, preferably in dry form, is mixed into an aqueous suspension or solution of the at least one compound selected from the group comprising matting agents, coalescing agents or film forming agents, anti-foaming agents, dispersants, rheology agents, cross-linking agents, biocides, light stabilizer, preserving agents, hardener, flame retardants and mixtures thereof. Then, the at least one binder, preferably in dry form, is dispersed into the suspension of the at least one particulate filler material and the at least one compound.

Thus, in one embodiment, the dry or liquid coating composition comprises, preferably consists of, at least one particulate filler material, at least one binder and at least one compound selected from the group comprising matting agents, coalescing agents or film forming agents, anti-foaming agents, dispersants, rheology agents, cross-linking agents, biocides, light stabilizer, preserving agents, hardener, flame retardants and mixtures thereof, and optionally water.

Alternatively, the dry or liquid coating composition consists of the at least one particulate filler material and the at least one binder, and optionally water.

If the dry or liquid coating composition further comprises at least one compound selected from the group comprising matting agents, coalescing agents or film forming agents, anti-foaming agents, dispersants, rheology agents, cross-linking agents, biocides, light stabilizer, preserving agents, hardener, flame retardants and mixtures thereof, the dry or liquid coating composition preferably comprises the at least one compound in an amount from 2.0 to 8.0 parts by weight (d/d), e.g. from 3.0 to 7.0 parts by weight (d/d), based on the total dry weight of the at least one particulate filler material and the at least one binder.

Characterization of Step c): Forming a Wood-Based Mat

According to step c) of the present invention, a wood-based mat having a first side and a reverse side is formed from the wood particles and/or fibres provided in step a).

It is appreciated that the term "wood-based mat formed from the wood particles and/or fibres" refers to a mixture of the wood particles and/or fibres and the optional at least one base binder and/or at least one additive which is used for forming the base of the final wood-based board.

The mixture of wood particles and/or fibres and the optional at least one base binder and/or at least one additive is laid into an even and consistent mat. This may be accomplished in batch mode or by continuous formation, preferably continuous formation.

The forming step c) may be undertaken by all the techniques and methods well known to the man skilled in the art for forming a mat from wood particles and/or fibres and optional at least one base binder and/or at least one additive. The forming step c) may be carried out with any conventional forming machine, for example, under conditions such that a continuous wood-based mat is obtained or other such equipment known to the skilled person. For example, wood particles and/or fibres and optional at least one base binder and/or at least one additive is spread by hand or the back and forth movement of a tray or hopper feeder or air separation for forming the wood-based mat.

If the wood-based board is manufactured in a wet process, the wood-based mat is preferably subjected to a step of reducing the water content of the mat. Such drying can be carried out before or during or after, preferably during, process step c). Such drying may be undertaken by all the techniques and methods well known to the man skilled in the art for reducing the water content of a wood-based mat. The drying may be carried out with any conventional method, e.g. by mechanically applied pressure, hot air, vacuum, force of gravity or suction power such that a wood-based mat having a water content that is reduced compared to the water content before the drying is obtained or other such equipment known to the skilled person. Preferably, the drying is carried out by mechanically applied pressure such as a dewatering drum, followed by a treatment with hot air.

It is appreciated that a single or multi-layer wood-based mat can be formed in step c), preferably a multi-layer wood-based mat is formed in step c).

In one embodiment, the multi-layer wood-based mat is formed in multiple forming steps. For example, a three-layer wood-based mat is formed in three forming steps.

The wood-based mat obtained in forming step c) has a first side and a reverse side.

Characterization of Step d): Pre-Pressing the Wood-Based Mat

According to step d) of the present invention, the wood-based mat of step c) is pre-pressed into a pre-pressed wood-based mat.

Thus, the wood-based mat obtained in step c) is pre-pressed prior to applying the dry or liquid coating composition of step b) and hot pressing.

The pre-pressing may be carried out by all the techniques and methods well known to the man skilled in the art for pre-pressing wood-based mats into a pre-pressed wood-based mat. The pre-pressing may be carried out with any conventional pressing machine, e.g. single-opening presses, multi-opening batch presses or continuous presses, under conditions such that a pre-pressed wood-based mat is obtained or other such equipment known to the skilled person.

It is appreciated that the pre-pressing temperature, optional pressure, and time will vary according to the solid wood-based board to be produced. The pre-pressing is preferably carried out at ambient temperature. Thus, the pre-pressing is preferably carried out at a temperature ranging from 10 to 60° C., more preferably from 15 to 30° C. and most preferably from 15 to 25° C. Additionally or alternatively, the pre-pressing is carried out at a pressure ranging from 5 to 40 bar and preferably from 8 to 35 bar.

Thus, the pre-pressing is preferably carried out at ambient temperature or a pressure ranging from 5 to 40 bar and preferably from 8 to 35 bar. Alternatively, the pre-pressing is carried out at ambient temperature and a pressure ranging from 5 to 40 bar and preferably from 8 to 35 bar.

Preferably, the pre-pressing is carried out at a temperature ranging from 10 to 60° C., more preferably from 15 to 30° C. and most preferably from 15 to 25° C. and a pressure ranging from 5 to 40 bar and preferably from 8 to 35 bar.

Characterization of Step e): Applying the Dry or Liquid Coating Composition on the Pre-Pressed Wood-Based Mat According to step e) of the present invention, the dry or liquid coating composition of step b) is applied on the first and/or reverse side of the pre-pressed wood-based mat obtained in step d).

It is decisive for the process of the present invention that the step of applying the dry or liquid coating composition of step b) on the first and/or reverse side of the wood-based mat is carried out after the pre-pressing step but before the hot pressing step. The inventors surprisingly found out that this order of steps leads to wood-based boards having excellent surface characteristics without implementing post processing steps. In particular, a wood-based board is obtained, wherein the wood-based board has improved surface characteristics, and especially improved optical characteristics. Furthermore, wood-based boards having improved mechanical properties can be obtained.

The coating composition can be in dry or liquid form. According to one embodiment, the coating composition applied in step e) of the inventive process is a dry coating composition. According to another embodiment, the coating composition applied in step e) of the inventive process is a liquid coating composition. In this case, the inventive process may further comprise a step e1) of drying the coating layer.

It is one requirement that the dry or liquid coating composition of step b) is applied at least on the first side of the pre-pressed wood-based mat.

According to one embodiment, process step e) is also carried out on the reverse side of the pre-pressed wood-based mat to manufacture a wood-based board being coated on the first and the reverse side. This step may be carried out for each side separately or may be carried out on the first and the reverse side simultaneously, preferably separately.

According to another embodiment, wherein the coating composition is in liquid form, process step e), and optionally step e1), is also carried out on the reverse side of the pre-pressed wood-based mat to manufacture a wood-based board being coated on the first and the reverse side. These steps may be carried out for each side separately or may be carried out on the first and the reverse side simultaneously.

According to one embodiment, step e) is carried out a second time or more times using a different or the same liquid coating composition. According to another embodiment, wherein the coating composition is in liquid form, step e), and optionally e1), is carried out a second time or more times using a different or the same liquid coating composition.

The coating may be applied onto the pre-pressed wood-based mat by conventional coating means commonly used in this art. Suitable coating methods are, e.g., metering size press, curtain coating, spray coating, roller coating and the like. Some of these methods allow for simultaneous coatings of two or more layers, which is preferred from a manufacturing economic perspective. However, any other coating method which would be suitable to form a coating on the pre-pressed wood-based mat may also be used.

In an exemplary embodiment the coating composition is applied by metering size press, curtain coating or spray coating. In a preferred embodiment, spray coating is used to apply the coating layer. In another preferred method, curtain coating is used to apply the coating layer.

According to an exemplary embodiment, a liquid coating composition is applied by metering size press, curtain coating or spray coating, preferably curtain coating. According to another exemplary embodiment, a dry coating composition is applied by spreading or electrostatic powder coating.

It is appreciated that process step e) may be carried out in a batch or continuous process. If process step e) is carried out in a continuous process, the dry or liquid coating composition of step b) is preferably applied on the first side of the pre-pressed wood-based mat obtained in step d) only.

According to one embodiment of the present invention, the liquid coating composition used to form the coating has a solid content from 10 to 80 wt.-%, preferably from 30 to 75 wt.-%, more preferably from 40 to 70 wt.-%, and most preferably from 45 to 65 wt.-%, based on the total weight of the liquid coating composition.

The liquid coating composition can have a Brookfield viscosity in the range from 20 to 3 000 mPas, preferably from 250 to 3 000 mPas, more preferably from 500 to 2 500 mPas and most preferably from 500 to 1 000 mPas.

Characterization of Step f): Hot Pressing the Pre-Pressed Wood-Based Mat

According to step f) of the present invention, the pre-pressed wood-based mat obtained in step e) is hot pressed into a solid wood-based board.

The hot pressing of step f) may be undertaken by all the techniques and methods well known to the man skilled in the art for hot pressing a pre-pressed wood-based mat into a solid wood-based board. The hot pressing of step f) may be carried out with any conventional pressing machine, e.g. single-opening presses, multi-opening batch presses or continuous presses, under conditions such that a solid wood-based board is obtained or other such equipment known to the skilled person. Preferably, hot pressing step f) is carried out with a continuous press.

For example, heat and optionally pressure, preferably heat and pressure, are applied to the pre-pressed wood-based mat in the hot pressing step such as to join together the wood particles and/or fibres and the optional at least one base binder and/or at least one additive and the coating applied on the first and/or reverse side comprising at least one particulate filler material and at least one binder and the optional at least one compound into a solid particle board in pressing step g).

It is appreciated that the hot pressing temperature, optional pressure, and time will vary according to the solid wood-based board to be produced. However, the hot pressing in step f) is preferably carried out at a temperature ranging from 130 to 260° C., more preferably from 160 to 240° C.

In one embodiment, the hot pressing is carried out at a pressing time factor, in relation to board thickness, of 10 to 25 s/mm, preferably of 10 to 20 s/mm and most preferably of 12 to 18 s/mm.

After hot pressing step f), the final solid wood-based board can be cooled prior to stacking. The final wood-based board does not require a post-processing step such as sanding or any other finishing operations (such as laminating or coating or direct printing application) for improving the surface properties of the wood-based board.

However, in one embodiment, the final wood-based board is subjected to a post-processing step such as sanding or any other finishing operations (such as laminating or coating or direct printing application) for further improving the surface properties, such as glossiness, abrasiveness etc., of the wood-based board.

The wood-based board may be a fibre board product, preferably a high-density fibre (HDF) board, medium-density fibre (MDF) board, low-density fibre (LDF) board, a particle board, an oriented strandboard (OSB), a hardboard or an insulation board.

Wood-Based Board and Uses

According to one aspect of the present invention, a wood-based board is provided.

The wood-based board comprises
a. a base of wood particles and/or fibres as defined herein, and
b. a coating on the first and/or reverse side of the wood-based board, wherein the coating comprises
   i. at least one particulate filler material, as defined herein, having a ratio of particle size $d_{80}$ to particle size $d_{20}$ [$d_{80}/d_{20}$] from 0.5 to 1.0, and
   ii. at least one binder as defined herein.

With regard to the definition of the wood particles and/or fibres, at least one particulate filler material, at least one binder and optional base binder, additives and compounds, and preferred embodiments thereof, reference is made to the statements provided above when discussing the technical details of the process of the present invention.

The wood-based board comprising
a. a base of wood particles and/or fibres as defined herein, and
b. a coating on the first and/or reverse side of the wood-based board, wherein the coating comprises
   i. at least one particulate filler material, as defined herein, having a ratio of particle size $d_{80}$ to particle size $d_{20}$ [$d_{80}/d_{20}$] from 0.5 to 1.0, and
   ii. at least one binder as defined herein, is preferably obtained by a process comprising the steps of:
a) providing wood particles and/or fibres, in dry form or in form of an aqueous suspension,
b) providing a dry or liquid coating composition comprising at least one particulate filler material and at least one binder,
c) forming a wood-based mat having a first side and a reverse side from the wood particles and/or fibres provided in step a),
d) pre-pressing the wood-based mat of step c) into a pre-pressed wood-based mat,
e) applying the dry or liquid coating composition of step b) on the first and/or reverse side of the pre-pressed wood-based mat obtained in step d), and
f) hot pressing the pre-pressed wood-based mat obtained in step e) into a solid wood-based board.

The wood-based board is preferably a fibre board product, more preferably a high-density fibre (HDF) board, medium-density fibre (MDF) board, low-density fibre (LDF) board, a particle board, an oriented strandboard (OSB), a hardboard or an insulation board.

In one embodiment, the coating is preferably penetrated into the surface of the wood-based board. Thus, it is preferred that the coating cannot be removed from the surface of the wood-based board without damaging the surface of the surface of the wood-based board.

The inventive wood-based board comprises a base of wood particles and/or fibres having a first side and a reverse side. The base of wood particles and/or fibres serves as support for a coating on the first and/or reverse side of the wood-based board. Thus, the wood-based board preferably comprises, more preferably consists of, a base of wood particles and/or fibres having a first side and a reverse side and a coating being in contact with the first and/or reverse side of the base of wood particles and/or fibres.

The at least one particulate filler material preferably has
i. a particle size $d_{98}$ of <500 μm,
ii. a particle size $d_{80}$ of 0.1 to 250 μm,
iii. a median particle size $d_{50}$ of 0.1 to 150 μm, and
iv. a particle size $d_{20}$ of 0.1 to 50 μm.

It is appreciated that the wood-based board is especially advantageous with regard to its surface characteristics, such as optical properties. In this regard, it is to be noted that the advantageous surface characteristics apply only to the side of the wood-based board which has been coated in accordance with process of the present invention.

In one embodiment, the surface of the coated side of the wood-based board preferably has
i. a brightness from 50 to 100%, according ISO R457 (Tappi452) and DIN 6167,
ii. a yellowness from 2 to 70%, according ISO R457 (Tappi452) and DIN 6167,
iii. L* from 50 to 100, according to DIN EN ISO 11664-4:2012,
iv. a* from −5 to 10, according to DIN EN ISO 11664-4:2012, and
v. b* from 0 to 30, according to DIN EN ISO 11664-4:2012.

Additionally or alternatively, the surface of the coated side of the wood-based board has
i. a maximum roughness amplitude Sz from 20 to 800 μm,
ii. an arithmetic mean roughness Sa from 2 to 80 μm, and
iii. a root mean square roughness Sq from 2 to 20 μm.

In one embodiment, the surface of the coated side of the wood-based board preferably has
i. a brightness from 50 to 100%, according ISO R457 (Tappi452) and DIN 6167,
ii. a yellowness from 2 to 70%, according ISO R457 (Tappi452) and DIN 6167,
iii. L* from 50 to 100, according to DIN EN ISO 11664-4:2012,
iv. a* from −5 to 10, according to DIN EN ISO 11664-4:2012, and
v. b* from 0 to 30, according to DIN EN ISO 11664-4:2012, and
   1. a maximum roughness (average roughness) amplitude Sz from 20 to 800 μm,
   2. an arithmetic mean roughness Sa from 2 to 80 μm, and
   3. a root mean square mean roughness Sq from 2 to 20 μm.

According to one preferred embodiment, the at least one particulate filler material has
i. a particle size $d_{98}$ of ≤500 μm,
ii. a particle size $d_{80}$ of 0.1 to 250 μm,
iii. a median particle size $d_{50}$ of 0.1 to 150 μm, and
iv. a particle size $d_{20}$ of 0.1 to 50 μm, and the surface of the coated side of the wood-based board has
   1. a brightness from 50 to 100%, according ISO R457 (Tappi452) and DIN 6167,
   2. a yellowness from 2 to 70%, according ISO R457 (Tappi452) and DIN 6167,
   3. L* from 50 to 100, according to DIN EN ISO 11664-4:2012,
   4. a* from −5 to 10, according to DIN EN ISO 11664-4:2012, and
   5. b* from 0 to 30, according to DIN EN ISO 11664-4:2012, and
i) a maximum roughness amplitude Sz from 20 to 800 μm,
ii) an arithmetic mean roughness Sa from 2 to 80 μm, and
iii) a root mean square roughness Sq from 2 to 20 μm.

The inventive wood-based board can be a single or multi-layer wood-based board. If the wood-based board is a multi-layer board, the board can be a three-layer or five-layer wood-based board. For example, the wood-based board is a single-layer wood-based board.

In one embodiment, the wood-based board further comprises a printing step on the first and/or reverse side of the wood-based board. It is preferred that such a print is located on the coating of the wood-based board.

The wood-based board according to the present invention specifically features high mechanical properties such as bending strength and modulus of elasticity, internal bond strength, thickness swelling and further processability.

The inventive wood-based board specifically features a high bending strength.

Preferably, the wood-based board has a bending strength of ≥5 N/mm$^2$, preferably from 10 to 50 N/mm$^2$ and most preferably from 15 to 45 N/mm$^2$ Unless indicated otherwise, the bending strength is determined according to DIN EN 310.

Additionally or alternatively, the inventive wood-based board features a high modulus of elasticity. Preferably, the wood-based board has a modulus of elasticity ≥500 N/mm$^2$, preferably from 1 000 to 4 500 N/mm$^2$ and most preferably from 1 500 to 3 500 N/mm$^2$. Unless indicated otherwise, the modulus of elasticity is determined according to DIN EN 310.

Additionally or alternatively, the inventive wood-based board features a high internal bond strength. Preferably, the wood-based board has an internal bond strength ≥0.10 N/mm$^2$, more preferably from 0.2 to 1.4 N/mm$^2$ and most preferably from 0.4 to 1.2 N/mm$^2$. Unless indicated otherwise, the internal bond strength is determined according to DIN EN 319. It is appreciated that the internal bond strength may be also named as transverse tensile strength.

Additionally or alternatively, the inventive wood-based board features a high thickness swelling. Preferably, the wood-based board has a thickness swelling after 24 h water storage of ≤20%, more preferably from 2.0 to 15.0% and most preferably from 4.0 to 10%. Unless indicated otherwise, the thickness swelling is determined according to DIN EN 317.

Additionally or alternatively, the inventive wood-based board features a high brightness. Preferably, the wood-based board has a brightness of at least 50%, more preferably of at least 65%, even more preferably of at least 75% and most preferably of at least 80%. Unless indicated otherwise, the brightness is determined according to ISO R457 (Tappi452) and DIN 6167.

For example, the wood-based board has a bending strength of ≥5 N/mm$^2$, preferably from 10 to 50 N/mm$^2$ and most preferably from 15 to 45 N/mm$^2$; or a modulus of elasticity of ≥500 N/mm$^2$, preferably from 1 000 to 4 500 N/mm$^2$ and most preferably from 1 500 to 3 500 N/mm$^2$; or an internal bond strength of ≥0.10 N/mm$^2$, more preferably from 0.2 to 1.4 N/mm$^2$ and most preferably from 0.4 to 1.2 N/mm$^2$; or a thickness swelling after 24 h water storage of ≤20%, more preferably from 2.0 to 15.0% and most preferably from 4.0 to 10%; or a brightness of at least 50%, more preferably of at least 65%, even more preferably of at least 75% and most preferably of at least 80%.

Alternatively, the wood-based board has a bending strength of ≥5 N/mm$^2$, preferably from 10 to 50 N/mm$^2$ and most preferably from 15 to 45 N/mm$^2$; and a modulus of elasticity of ≥500 N/mm$^2$, preferably from 1 000 to 4 500 N/mm$^2$ and most preferably from 1 500 to 3 500 N/mm$^2$; and an internal bond strength of ≥0.10 N/mm$^2$, more preferably from 0.2 to 1.4 N/mm$^2$ and most preferably from 0.4 to 1.2 N/mm$^2$; and a thickness swelling after 24 h water storage of ≤20%, more preferably from 2.0 to 15.0% and most preferably from 4.0 to 10%; and a brightness of at least 50%, more preferably of at least 65%, even more preferably of at least 75% and most preferably of at least 80%.

In one embodiment, the wood-based board of the present invention has a thickness from 0.2 to 300.0 mm, preferably from 2.0 to 40.0 mm and most preferably from 4.0 to 20 mm.

According to another aspect, the present invention refers to the use of a dry or liquid coating composition comprising at least one particulate filler material and at least one binder as defined herein for in-line coating of wood-based boards.

With regard to the definition of the dry or liquid coating composition comprising at least one particulate filler material and at least one binder and preferred embodiments thereof, reference is made to the statements provided above when discussing the technical details of the process of the present invention.

An "in-line" coating or process in the meaning of the present invention refers to a process in which the coating step is placed in series, especially horizontally in series, with a pre-pressing and hot pressing step. In other words, the dry or liquid coating composition comprising at least one particulate filler material and at least one binder is applied on the first and/or reverse side of a pre-pressed wood-based mat, i.e. after pre-pressing, but before hot pressing the coated pre-pressed wood-based mat to form the solid wood-based board.

The scope and interest of the invention will be better understood based on the following examples which are intended to illustrate certain embodiments of the invention and are non-limitative.

EXAMPLES

Measurement Methods

The following measurement methods are used to evaluate the parameters given in the examples and claims.

Particle Size Distribution (Weight % Particles with a Diameter <X) and Weight Median Diameter ($d_{50}$) of a Particulate Filler Material Having a Particle Size $d_{50}$ of ≤45 μm Weight median grain diameter and grain diameter weight distribution of a particulate filler material such as calcium carbonate, were determined via the sedimentation method, i.e. an analysis of sedimentation behaviour in a gravimetric field. The measurement was made with a Sedigraph™ 5120.

The method and instrument are known to the skilled person and are commonly used to determine grain size of fillers and pigments. The measurements is carried out in an aqueous solution of 0.1 wt-% $Na_4P_2O_7$. The samples were dispersed using a high speed mixer and ultrasound.

Particle Size Distribution (Volume % Particles with a Diameter <X) and Volume Median Diameter ($d_{50}$) of a Particulate Filler Material Having a Particle Size $d_{50}$ of >45 μm Volume median grain diameter and grain diameter volume distribution of a particulate filler material were determined via laser diffraction, i.e. the particle size is determined by measuring the intensity of light scattered as a laser beam passes through a dispersed particulate sample. The measurement was made with a Mastersizer 2000 or a Mastersizer 3000 of Malvern Instruments Ltd. (operating instrument software version 1.04). Alternatively, the measurement can be made with a HELOS particle-size-analyzer of Sympatec, Germany. The measurement may be considered equivalent to weight distribution assuming a constant density throughout the particle size distribution, and reference is made to the measurement technique.

The method and the instruments are known to the skilled person and are commonly used to determine grain size of fillers and pigments. The measurement is carried out in an aqueous solution of 0.1 wt.-% $Na_4P_2O_7$. The samples are dispersed using a high speed stirrer and supersonics.

BET Specific Surface Area of a Material

Throughout the present document, the specific surface area (in $m^2/g$) of the filler material is determined using the BET method (using nitrogen as adsorbing gas), which is well known to the skilled man (ISO 9277:2010). The total surface area (in $m^2$) of the filler material is then obtained by multiplication of the specific surface area and the mass (in g) of the filler material prior to treatment.

Solids Content of an Aqueous Suspension

The suspension solids content (also known as "dry weight") was determined using a Moisture Analyser HR73 from the company Mettler-Toledo, Switzerland, with the following settings: temperature of 120° C., automatic switch off 3, standard drying, 5 to 20 g of suspension.

pH of an Aqueous Suspension

The pH of the aqueous slurry was measured using a standard pH-meter at room temperature, approximately 22° C.

Pigment Volume Concentration (PVC)

The PVC was calculated in accordance with the formula:

$$PVC = \frac{\sum VP + \sum VF}{\sum VP + \sum VF + \sum VB} * 100$$

VP: Volume Pigment
VF: Volume Filler
VB: Volume Binder

Whiteness and Yellowness

Whiteness (or brightness) and Yellowness were measured using an ELREPHO 450, Datacolor according ISO R457 (Tappi452) and DIN 6167. The CIELAB L*, a*, b* coordinates and brightness CIE were measured using Minolta-Spectrophotometer CM-3610d (OF 22) in accordance with DIN EN ISO 11664-4:2012.

Gloss

Surface gloss was measured using Cotem CGL-3W device from Lehmann, according to EN ISO 8254-1:2003, TAPPI 75° (%).

Evaluation of Surface Roughness

Roughness was determined by topographical measurements using Nanoskop device from COTEM MESSSYSTEME. Measuring standard was for the x-axis: measuring length: 4.8 mm, resolution: 500 points and for the y-axis: measuring length 4.8 mm, resolution: 250 points, applying high-pass filter Gauss. Values:

Sz=maximum roughness amplitude
Sa=arithmetic mean roughness
Sq=root mean square roughness Size of Wood Fibres The size or the fibres was determined via fractioning by using sieve analysis. The measurement was made with an air jet sieve from Alpine e200 LS of HOSOKAWA ALPINE AG, Germany.

The measurement was carried out by applying an air flow to the fibres being placed in a sieve by a rotating slit nozzle located underneath the sieve. The fibres are thus subjected to a fractioning by air dispersing and simultaneous suction of the fibres through the sieve over a time period of 5 min. The balance between the amount of fibre before being placed in the sieve and after fractioning was considered as the through fraction in gram. Depending on the number of the chosen sieve mesh widths, the fractioning is repeated starting with the smallest sieve mesh widths to the largest sieve mesh width. Thus, for each sieve mesh width the percentage of the total amount of the fibres which is fractionized can be calculated. The mesh widths of the sieves were chosen among the following mesh widths (in mm): 0.05-0.063-0.08-0.1-0.125-0.2-0.315-0.4-0.5-0.63-0.8-1.0-1.6-2.0-3.0-3.15-4.0-5.0. For each analysis, at least three sieve mesh widths were chosen such that the size of the fibres was sufficiently covered by the chosen mesh widths. Unless otherwise indicated the size of the fibres is measured at a sieve mesh width of 0.05 mm, 1.0 mm and 3.0 mm.

Particle Size of Wood Particles

Particle sizes of wood particles were determined by mechanical vibration sieves and calculation of grading curves. Sieves with differing sieve meshes were setup as a tower starting with the smallest sieve mesh on the bottom and the largest sieve mesh on the top. The wood particles were placed on the top sieve and the sieve tower was fixed in a vibrating machine. The wood particles are thus subjected to fractioning by continuous shaking of the sieve tower within a timer period of 5 min. The balance between the amount of wood particles before being placed on the top sieve and after fractioning was considered as the through fraction in gram. Thus, for each sieve mesh width the percentage of the total amount of wood particles which is fractionized can be calculated. The mesh widths of the sieves were chosen among the following mesh widths (in mm): 0.063-0.1-0.315-0.5-1.0-1.6-2.0-3.15-4.0-6.3-8-12.

For each analysis at least seven mesh widths were chosen such that the size of the wood particles was sufficiently covered by the chosen mesh widths.

The particle length and thickness of the wood particles were determined by electron microscopic analysis, such as transmission electron microscope (TEM) or scanning electron microscope (SEM).

Wood Moisture Content

The wood moisture content is determined in accordance with DIN EN 322. The term "equilibrium moisture" has to be understood as moisture content of wood or wood based panel at which the wood neither gains nor loses moisture when surrounded by air at a given relative humidity and temperature (definition in "wood hand book") The moisture content was determined after 7 days storage in a defined climate of: 65% relative humidity and 20° C. temperature.

Density

Density (or raw density) measurements were made in accordance with DIN EN 323.

Thickness Swelling

Thickness swelling measurements were made after 24 h water exposure in accordance with DIN EN 317.

Internal Bond Strength

Internal bond strength measurements were made in accordance with DIN EN 319.

Bending Strength and Modulus of Elasticity

Bending Strength and Modulus of Elasticity Bending strength and modulus of elasticity were measured in accordance with DIN EN 310.

EXAMPLES

Substrate 1: Medium Density Fibreboard. Production parameters are displayed in table 1 below:

TABLE 1

| Panel Structure | Single layer |
|---|---|
| Raw Material | Pine Fibres |

TABLE 1-continued

| | |
|---|---|
| Panel Thickness | 17.5 mm |
| Raw Density | 700 kg/m$^3$ |
| Press Temperature | 200° C. ± 2° C. |
| Press Time Factor | 12 s/mm |
| Amount Of Binder | 10% |
| Type Of Binder | K345, 68% BASF |
| Hydrophobising agent | 0.5% Hydrowax 140, Sasol Germany |

Substrate 2: Particle Board. Production parameters are displayed in table 2 below.

TABLE 2

| | |
|---|---|
| Panel Structure | Three layer |
| Raw Material | Industrial Wood Particles |
| Panel Thickness | 17.5 mm |
| Raw Density | 680 kg/m$^3$ |
| Press Temperature | 220° C. ± 2° C. |
| Press Time Factor | 15 s/mm |
| Amount Of Binder | 12% (Surface layer); 8.5% (Middle Layer) |
| Type Of Binder | K350, 66% BASF |
| Hydrophobising agent | 0.5% Hydrowax 140, Sasol Germany |

Production Set-Up:

a. Resin (binder) application on wood fibres (for a medium density fibreboard (MDF), substrate 1) or wood particles (for a particle board, substrate 2) and addition of hydrophobising agent was carried out in a blender (resin application of surface layer wood particles and middle layer particles for the particle board was executed separately).

b. Resinated wood fibres or wood particles were formed into a wood fibre mat or wood particle mat by manual spreading.

c. The wood fibre mat or wood particle mat was pre-pressed at ambient temperature, i.e. 23° C.±2° C., and a pressure of 10 bar.

d. "Coating 1" and "Coating 2" (see tables 3 to 6 for composition and characteristics) were applied on one side of the pre-pressed wood fibre mat or wood particle mat by air-pressure paint spray gun. "Coating 2 duplex" was also applied on the second side of the pre-pressed and on one side coated wood fibre mat. Coat weight was for each trial point 100 g/m$^2$ (dry).

e. Pre-pressed and coated wood fibre mat or wood particle mat was then hot pressed to a solid board in a hot press under the conditions disclosed in Tables 1 and 2. (Coating 2 duplex in the results means that the pre-pressed and on one side coated wood fibre mat was turned 180° and the second surface side was coated additionally).

TABLE 3

Composition of coating 1

| Raw Materials | Product | Parts by weight |
|---|---|---|
| Calcium carbonate 1 | Natural ground calcium carbonate, commercially available from Omya International AG, Switzerland; $d_{98}$: 7.0 µm; $d_{80}$: 3.3 µm; $d_{50}$: 1.5 µm; $d_{20}$: 0.5 µm; BET: 6.9 m$^2$/g; brightness: 95.6%; yellowness index: 0.75; CIELAB L*: 98.5; CIELAB a*: −0.1; CIELAB b*: 0.4; 78% aqueous suspension, based on the total weight of the suspension. | 90.0 |
| Styrene butadiene latex 1 | Styronal D628 | 10.0 |
| Total | | 100.0 |

TABLE 4

Coating characteristics of coating 1

| | |
|---|---|
| Solids [%] | 69.9 |
| PVC [%] | 77.5 |
| pH | 8.1 |
| Viscosity [mPa · s] (RPM 100, Spindle 2) | 190 |

TABLE 5

Composition of coating 2

| Raw Materials | Product | Parts by weight based on 100 parts host material |
|---|---|---|
| Sodium polyphosphate | Calgon N | 0.1 |
| Ammonium hydroxide solution | Ammoniak, 25% | 0.2 |
| Modified Polymer | Tego Dispers 750 W | 1.5 |
| Polyurethane system | Tafigel PUR 45 | 0.8 |
| Polyurethane system | Tafigel PUR 41 | 0.4 |
| Organic polymer | Tego Foamex 830 | 0.4 |
| Ester alcohol | Texanol | 0.5 |
| Dipropylenglykol monomethylether | Dowanol DPnB | 0.5 |
| Isothiazolinon | Mergal 723K | 0.1 |
| Silicate | Bentone LT | 0.1 |
| Titanium dioxide 1 | TiONA 595 | 21.0 |
| Calcium carbonate 2 | Natural ground calcium carbonate, commercially available from Omya International AG, Switzerland; $d_{98}$: 10.3 µm; $d_{80}$: 4.9 µm; $d_{50}$: 2.6 µm; $d_{20}$: 1.1 µm; BET: 3.6 m$^2$/g; brightness: 93.1%; yellowness index: 1.7; CIELAB L*: 97.7; CIELAB a*: −0.03; CIELAB b*: 0.9. | 9.0 |
| Clay 1 | Burges No. 50 | 13.0 |
| Water | Tab Water | 33.4 |
| Styrene acrylate 1 | Mowilith LDM 7451, 47% | 19.0 |
| Total | | 100.0 |

TABLE 6

| Coating characteristics of coating 2 | |
| --- | --- |
| Solids [%] | 53.6 |
| PVC [%] | 62.3 |
| pH | 8.7 |
| Viscosity [mPa · s] (RPM 100, Spindle 2) | 120 |

Figure 2:
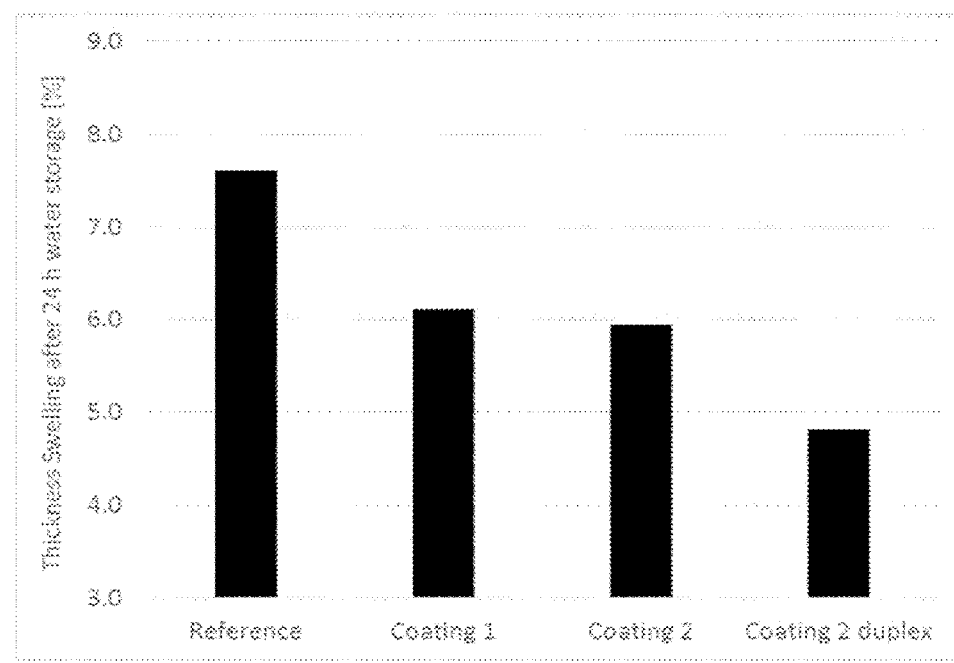
FIG. 2 shows the thickness swelling of a medium-density fibre board substrate with example coatings in accordance with the invention, in comparison to reference boards without coatings.
Figure 3:
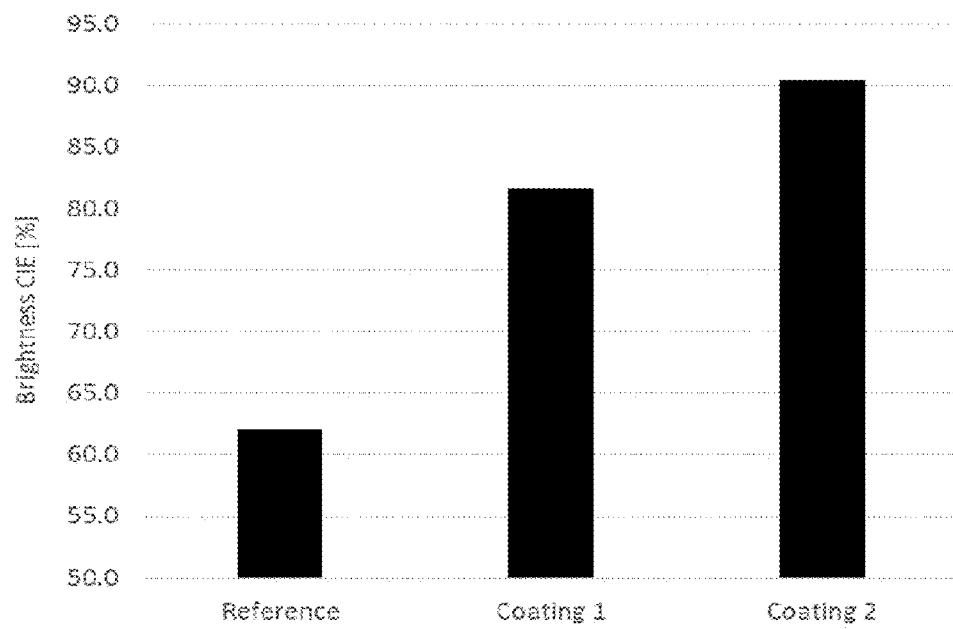
FIG. 3 shows the brightness CIE of a medium-density fibre board substrate with example coatings in accordance with the invention, in comparison to reference boards without coatings.
Figure 4:
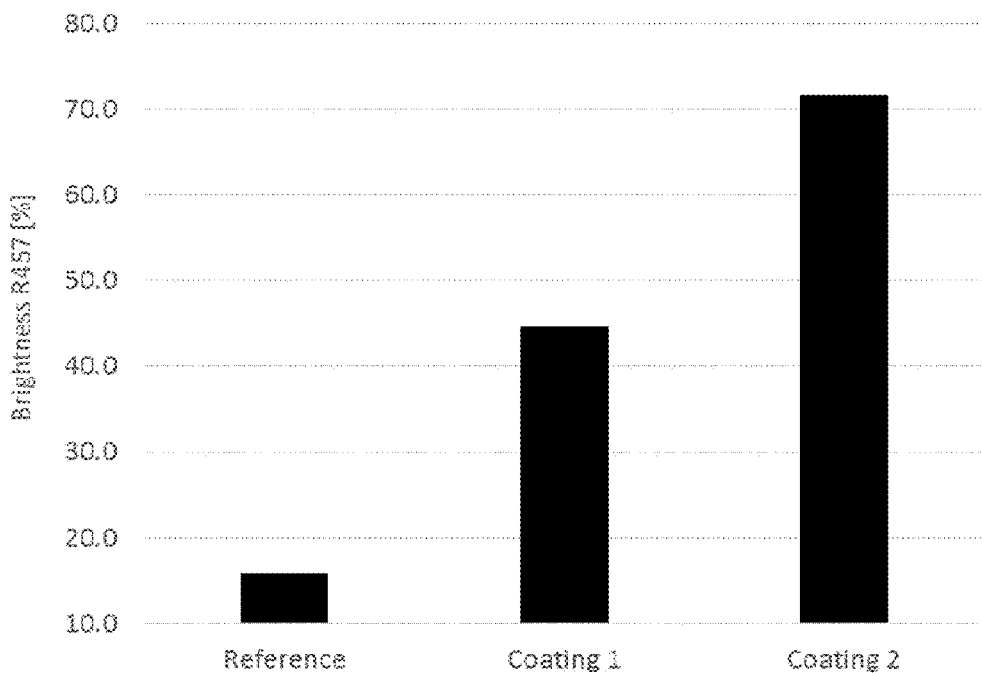
FIG. 4 shows the brightness R457 of a medium-density fibre board substrate with example coatings in accordance with the invention, in comparison to reference boards without coatings.
Figure 5:
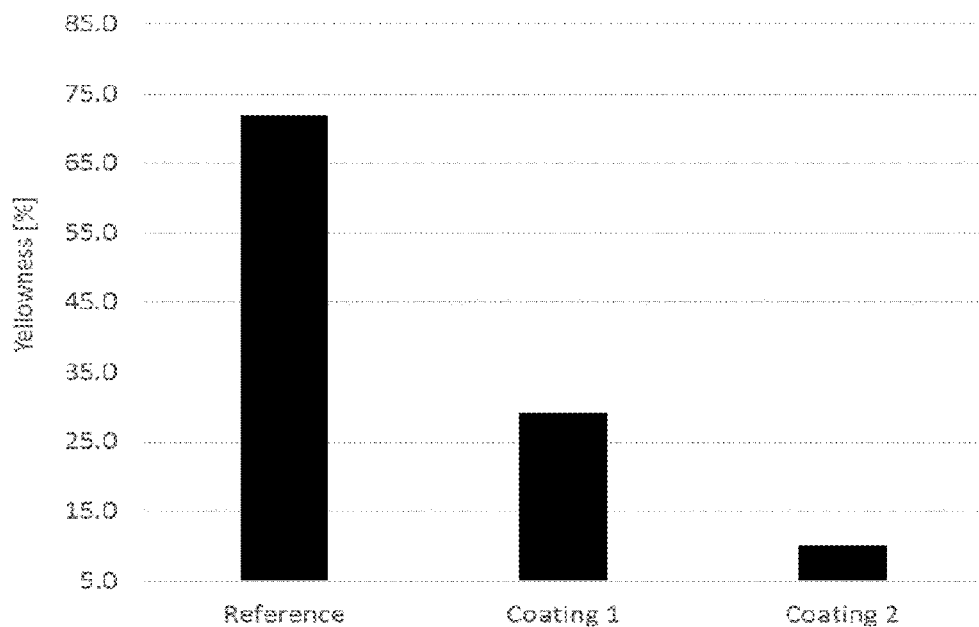
FIG. 5 shows yellowness of a medium-density fibre board substrate with example coatings in accordance with the invention, in comparison to reference boards without coatings.
Figure 6:
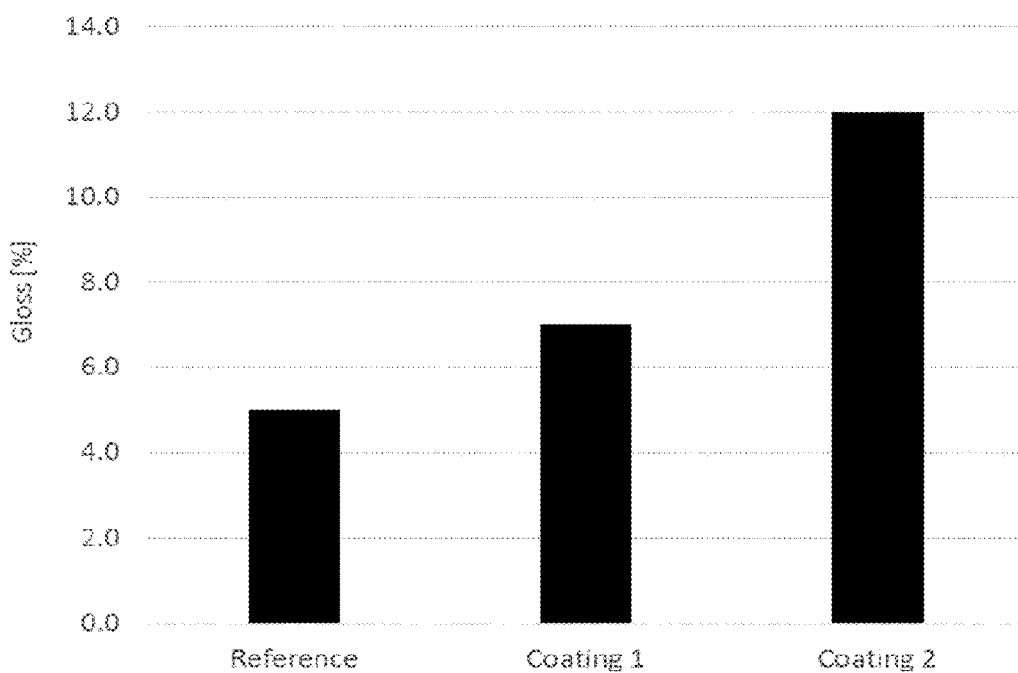
FIG. 6 shows the gloss of a medium-density fibre board substrate with example coatings in accordance with the invention, in comparison to reference boards without coatings.
Figure 7:
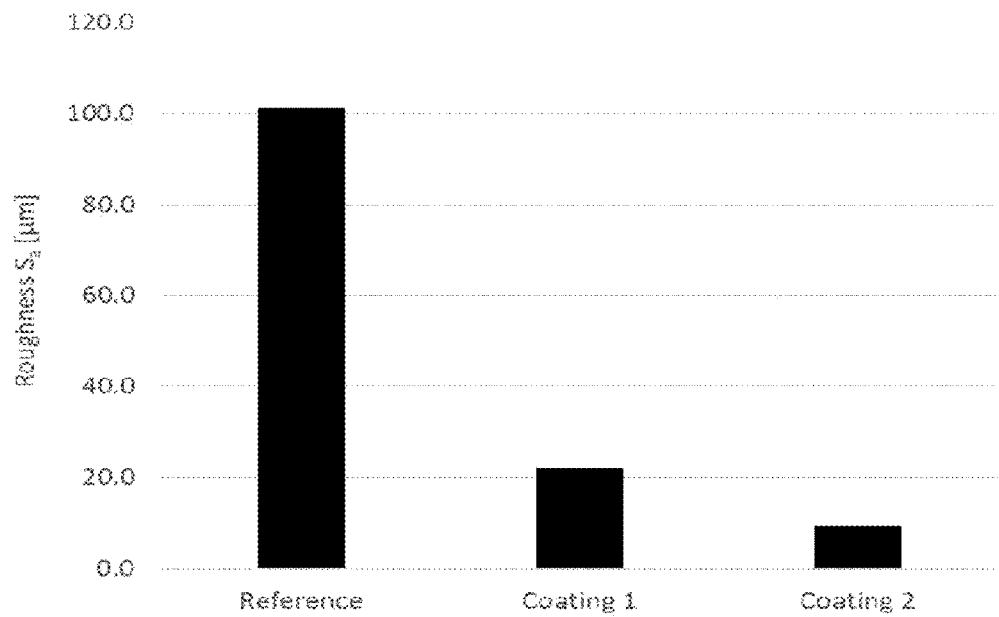
FIG. 7 shows roughness Sa of a medium-density fibre board substrate with example coatings in accordance with the invention, in comparison to reference boards without coatings.
Figure 8:
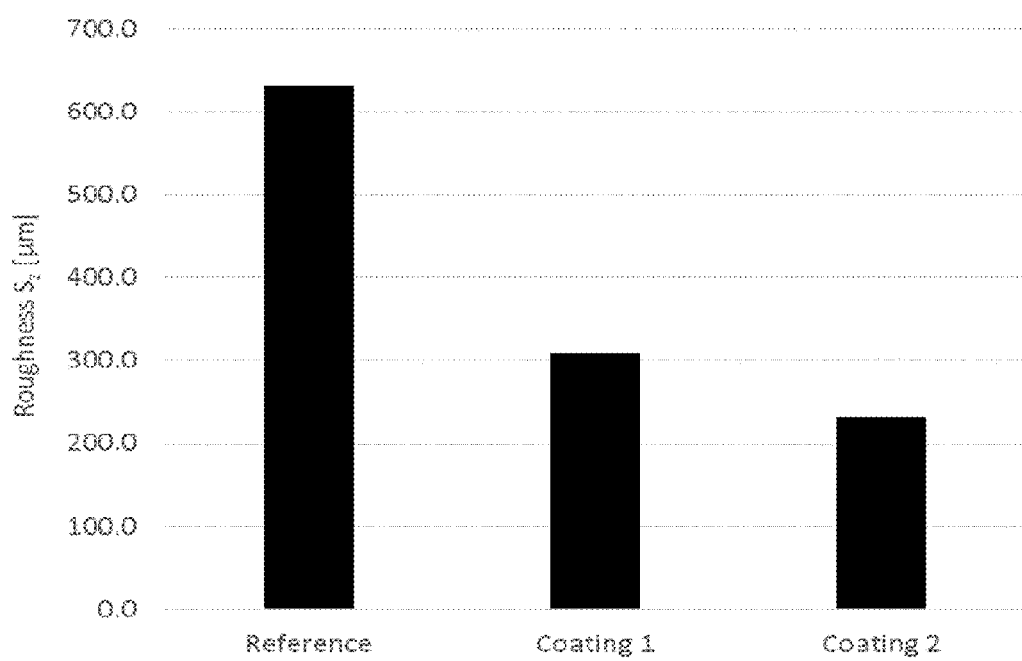
FIG. 8 shows roughness Sz of a medium-density fibre board substrate with example coatings in accordance with the invention, in comparison to reference boards without coatings.
Figure 9:
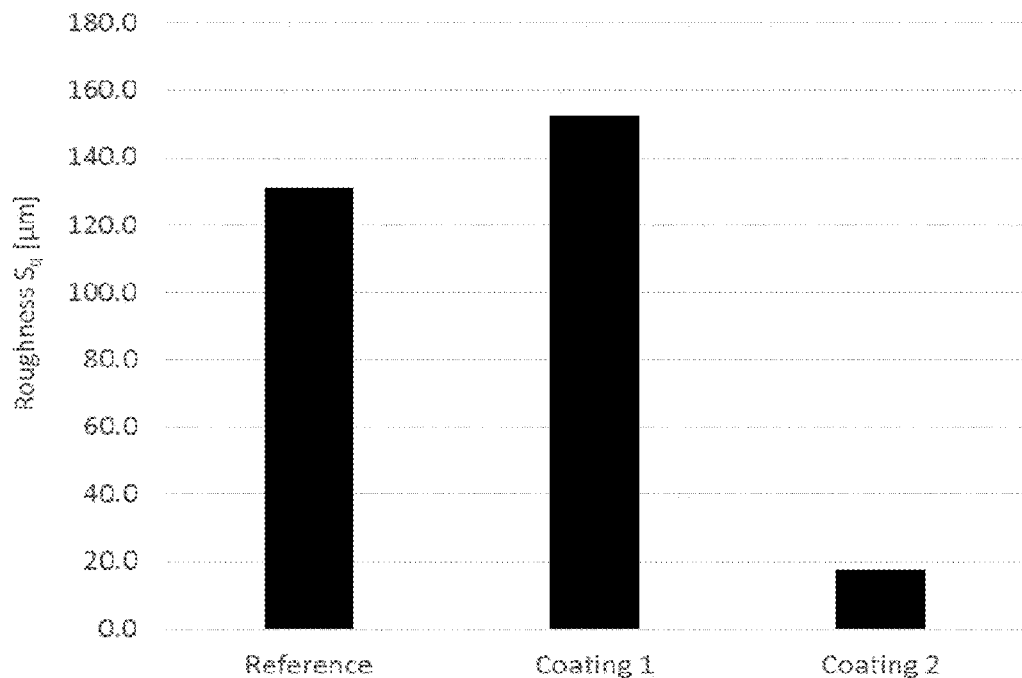
FIG. 9 shows the roughness Sq of a medium-density fibre board substrate with example coatings in accordance with the invention, in comparison to reference boards without coatings.
Figure 10:
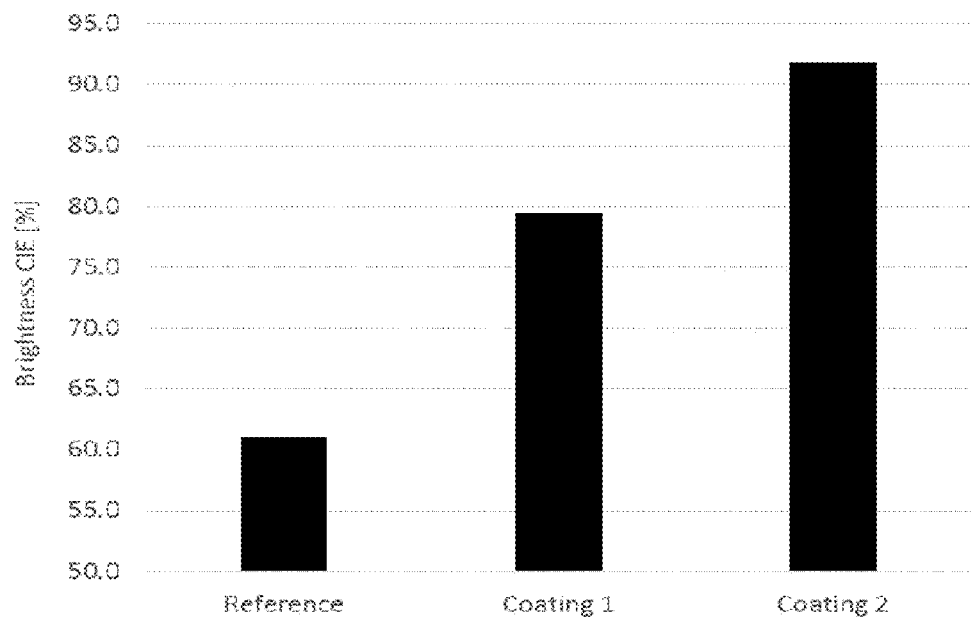
FIG. 10 shows the brightness CIE of a particle board substrate with example coatings in accordance with the invention, in comparison to reference boards without coatings.
Figure 11:
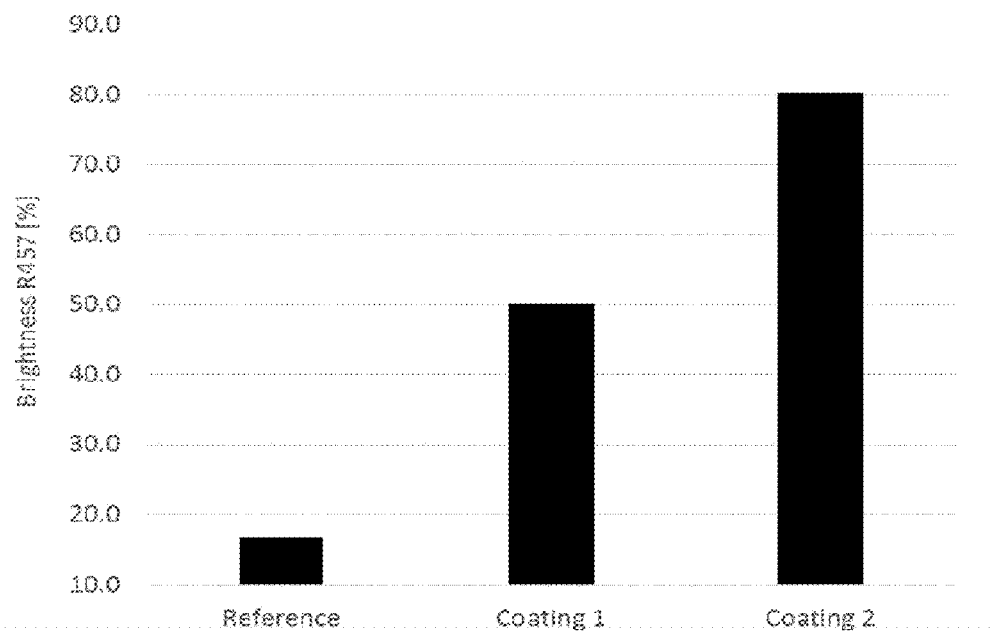
FIG. 11 shows the brightness R457 of a particle board substrate with example coatings in accordance with the invention, in comparison to reference boards without coatings.
Figure 12:
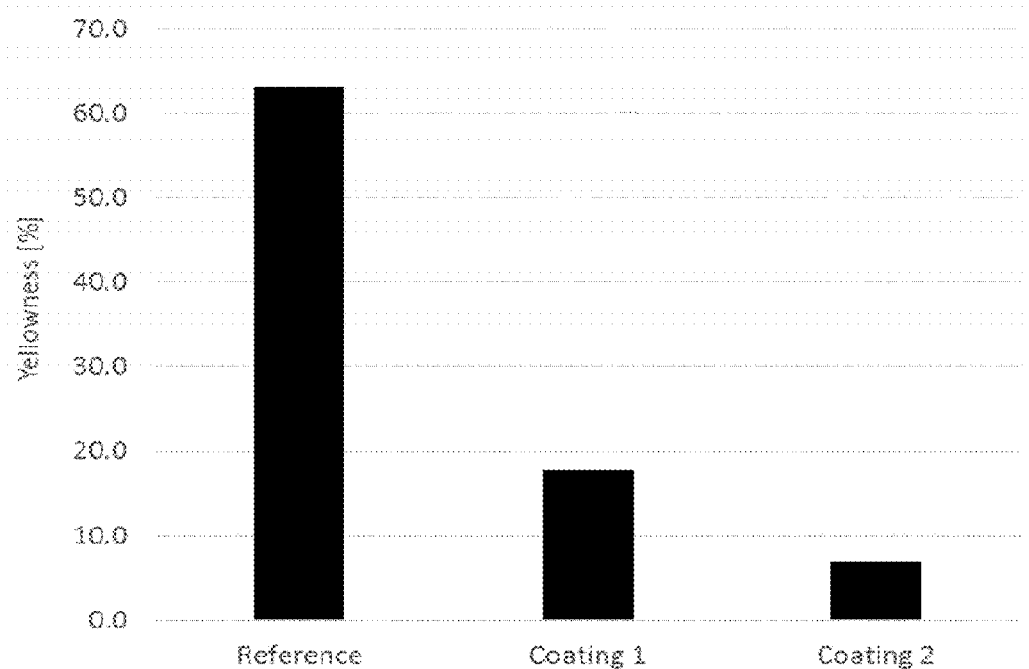
FIG. 12 shows the yellowness of a particle board substrate with example coatings in accordance with the invention, in comparison to reference boards without coatings.
Figure 13:
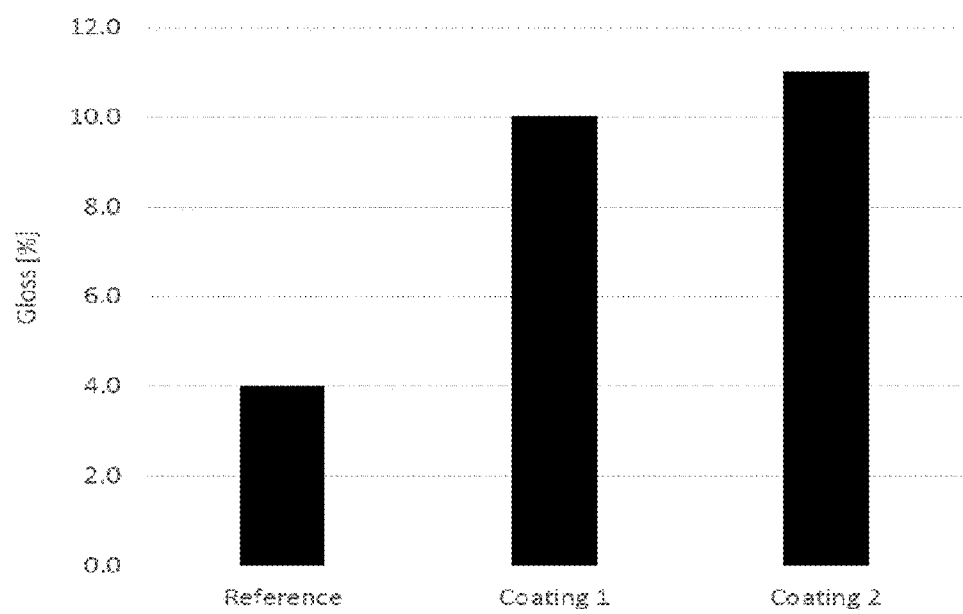
FIG. 13 shows the gloss of a particle board substrate with example coatings in accordance with the invention, in comparison to reference boards without coatings.

In general, it was possible to manufacture a wood-based board, i.e. a particle board, having a sandwich structure (with smooth transition between the layers, or interaction of the layers). It was also possible to manufacture a single-layer medium density fibreboard as wood-based board. The wood-based boards featured optimised board physical, mechanical and optical board parameters compared to a reference raw board. The reference boards were manufactured the same way as described for the inventive wood-based boards (table 1 and table 2), but without applying a coating between the pre-pressing and hot pressing step. In particular, it was possible to improve the bending strength and modulus of elasticity, the thickness swelling, the brightness CIE, the brightness R457, the yellowness, the gloss as well as the roughness Sa, Sz, Sq of the wood-based boards coated with coating 1 and coating 2 compared to the reference raw boards. The results are outlined in FIGS. 1 to 9 for substrate 1, i.e. the results for MDF boards coated with coating 1, coating 2. FIG. 1 and FIG. 2 also show the results of the MDF boards coated on both sides, i.e. coating 2 duplex.

As regards substrate 2, it was possible to improve the brightness CIE, the brightness R457, the yellowness as well as the gloss compared to the reference raw board. The results are outlined in FIGS. 10 to 13 for substrate 2, i.e. the improved optical properties of the Particle Board surface by using coating 1 and coating 2.

Table 7 outlines the theoretically achieved classifications of the boards coated with coating 1 or 2 following European standard DIN EN 622.

TABLE 7

| Sample | MBH | MBH.H | MBH.E | MBH.LA 1 | MBH.LA 2 | MBH.HLS 1 | MBH.HLS 2 |
| --- | --- | --- | --- | --- | --- | --- | --- |
| Reference | x | x | — | x | x | X | — |
| Coating 1 | x | x | X | x | x | X | x |
| Coating 2 | x | x | X | x | x | X | x |

We claim:

1. Process for manufacturing a wood-based board, the process comprising the steps of:
    a) providing wood particles and/or fibres, in dry form or in form of an aqueous suspension,
    b) providing a dry or liquid coating composition comprising at least one particulate filler material and at least one binder,
    c) forming a wood-based mat having a first side and a reverse side from the wood particles and/or fibres provided in step a),
    d) pre-pressing the wood-based mat of step c) into a pre-pressed wood-based mat,
    e) applying the dry or liquid coating composition of step b) on the first and/or reverse side of the pre-pressed wood-based mat obtained in step d), and
    f) hot pressing the pre-pressed wood-based mat obtained in step e) into a solid wood-based board.

2. The process according to claim 1, wherein the wood particles and/or fibres of step a) originate from primary wood sources or secondary wood sources.

3. The process according to claim 1, wherein the wood particles and/or fibres of step a) are combined simultaneously or separately in any order with at least one base binder and/or at least one additive, wherein the at least one base binder is selected from the group consisting of phenol-formaldehyde resin (PF), urea-formaldehyde resin (UF), melamine-formaldehyde resin (MF), melamine-urea-formaldehyde resin (MUF), urea-melamine-formaldehyde resin (UMF), urea-melamine-phenol-formaldehyde resin (UMPF), epoxy resin, methylene diphenyl diisocyanate resin (MDI), polyurethane resin (PU), resorcinol resin, starch or carboxymethylcellulose and mixtures thereof, and/or the at least one additive is selected from the group consisting of waxes, colorants, filler, dispersants, biocides, hardener, flame retardants and mixtures thereof.

4. The process according to any claim 1, wherein the wood particles of step a) are wood chips.

5. The process according to claim 1, wherein the at least one particulate filler material of step b) is selected from the group consisting of dolomite, ground calcium carbonate (GCC), precipitated calcium carbonate (PCC), magnesium hydroxide, talc, gypsum, titanium dioxide, kaolin, silicate, mica, barium sulphate, calcined clay, non-calcined (hydrous) clay, bentonite, inorganic or organic pigments and mixtures thereof.

6. The process according to claim 1, wherein the at least one particulate filler material of step b) is provided
    i) in powder form, or
    ii) in form of an aqueous slurry comprising the filler material in an amount from 1.0 to 80.0 wt.-%, based on the total weight of the aqueous slurry.

7. The process according to claim 1, wherein the at least one particulate filler material of step b) is at least one particulate calcium carbonate-containing material having a median particle size $d_{50}$ from 0.1 µm to 150.0 µm, and/or a specific surface area of from 0.5 to 200.0 $m^2/g$, as measured by the BET nitrogen method.

8. The process according to claim 1, wherein the at least one binder of step b) is selected from the group consisting of alkyd resin, epoxy resin, epoxy ester resin, poly(vinyl alcohol), poly(vinyl pyrrolidone), poly(vinyl acetate), poly(oxazolines), poly(vinylacetamides), partially hydrolyzed poly(vinyl acetate/vinyl alcohol), poly((meth)acrylic acid), poly((meth)acrylamide), poly(alkylene oxide), polyether, saturated polyester, sulfonated or phosphated polyesters and polystyrenes, poly(styrene-co-(meth)acrylate), poly(styrene-co-butadiene), polyurethane latex, poly(n-butyl (meth) acrylate), poly(2-ethylhexyl (meth)acrylate), copolymers of (meth)acrylates, copolymers of vinylacetate and n-butyl (meth)acrylate casein, copolymers of polyvinylchloride, gelatin, cellulose ethers, zein, albumin, chitin, chitosan, dextran, pectin, collagen derivatives, collodian, agar-agar, arrowroot, guar, carrageenan, starch, tragacanth, xanthan, or rhamsan and mixtures thereof.

9. The process according to claim 1, wherein the dry or liquid coating composition of step b) comprises the at least one particulate filler material in an amount from >60 parts by dry weight based on dry coating (d/d), and the at least one binder in an amount from <40 parts d/d, and the sum of the amount of the at least one particulate filler material and the at least one binder is 100.0 parts d/d, based on the total dry weight of the at least one particulate filler material and the at least one binder.

10. The process according to claim 9, wherein the dry or liquid coating composition of step b) comprises the at least one particulate filler material in an amount from >80 parts by dry weight based on dry coating (d/d), and the at least one binder in an amount from <20 parts d/d, and the sum of the amount of the at least one particulate filler material and the at least one binder is 100.0 parts d/d, based on the total dry weight of the at least one particulate filler material and the at least one binder.

11. The process according to claim 1, wherein the dry or liquid coating composition of step b) further comprises at least one compound selected from the group comprising matting agents, coalescing agents or film forming agents, anti-foaming agents, dispersants, rheology agents, cross-linking agents, biocides, light stabilizer, preserving agents, hardener, flame retardants and mixtures thereof, in an amount from 2.0 to 8.0 parts by weight (d/d), based on the total dry weight of the at least one particulate filler material and the at least one binder.

12. The process according to claim 11, wherein the dry or liquid coating composition of step b) comprises the at least one compound in an amount from 3.0 to 7.0 parts by weight (d/d) based on the total dry weight of the at least one particulate filler material and the at least one binder.

13. The process according to claim 1, wherein a single or multi-layer wood-based mat is formed in step c).

14. The process according to claim 1, wherein pre-pressing step d) is carried out at ambient temperature ranging from 10 to 60° C., and/or a pressure ranging from 5 to 40 bar.

15. The process according to claim 1, wherein coating step e) is carried out by metering size press, curtain coating, spray coating or roller coating.

16. The process according to claim 1, wherein coating step e) is carried out on the first and reverse side of the pre-pressed wood-based mat to manufacture a wood-based board being coated on the first and the reverse side, and/or coating step e) is carried out a second time using a different or the same liquid coating composition of step b).

17. The process according to claim 1, wherein hot pressing step f) is carried out at a temperature ranging from 130 to 260° C.

18. The process according to claim 1, wherein the wood-based board is a high-density fibre (HDF) board, medium-density fibre (MDF) board, low-density fibre (LDF) board, a particle board, an oriented strandboard (OSB), a hardboard or an insulation board.

19. The process according to claim 1, wherein the at least one particulate filler material has a ratio of particle size $d_{80}$ to particle size $d_{20}$ [$d_{80}/d_{20}$] from 0.5 to 1.0.

20. The process according to claim 1, wherein the at least one particulate filler material has
  i. a particle size $d_{98}$ of <500 μm,
  ii. a particle size $d_{80}$ of 0.1 to 250 μm,
  iii. a median particle size $d_{50}$ of 0.1 to 150 μm, and
  iv. a particle size $d_{20}$ of 0.1 to 50 μm.

* * * * *